United States Patent
Reading et al.

(10) Patent No.: US 12,279,065 B2
(45) Date of Patent: Apr. 15, 2025

(54) SYSTEMS AND METHODS FOR MULTI-USER VIDEO COMMUNICATION WITH ENGAGEMENT DETECTION AND ADJUSTABLE FIDELITY

(71) Applicant: Samsung Electronics Company, Ltd., Suwon-si (KR)

(72) Inventors: Dean N. Reading, Sunnyvale, CA (US); Marc Estruch Tena, San Jose, CA (US); Lin Sun, San Jose, CA (US); Fulya Yilmaz, San Francisco, CA (US); Cathy Kim, Palo Alto, CA (US); Hanna Fuhrmann, San Francisco, CA (US); Catherine S. Kim, San Jose, CA (US); Jun Yeon Cho, San Jose, CA (US); Imran Mohammed, Santa Clara, CA (US); Curtis D. Aumiller, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 17/725,468

(22) Filed: Apr. 20, 2022

(65) Prior Publication Data

US 2023/0344956 A1 Oct. 26, 2023

(51) Int. Cl.
*H04N 5/265* (2006.01)
*G06T 7/70* (2017.01)
(Continued)

(52) U.S. Cl.
CPC ............. *H04N 5/265* (2013.01); *G06T 7/70* (2017.01); *G06V 40/10* (2022.01); *H04L 65/60* (2013.01);
(Continued)

(58) Field of Classification Search
CPC .... H04N 5/265; H04N 5/2622; H04N 5/2628; H04N 9/646; H04N 5/262; H04N 9/64;
(Continued)

(56) References Cited

U.S. PATENT DOCUMENTS

| 6,771,303 B2 | 8/2004 | Zhang |
| 8,253,852 B2 | 8/2012 | Bilbrey |

(Continued)

FOREIGN PATENT DOCUMENTS

| JP | 2020-202567 A | 12/2020 |
| KR | 10-2020-0108196 A | 9/2020 |
| KR | 10-2021-0047112 A | 4/2021 |

OTHER PUBLICATIONS

PCT Search Report and written decision in PCT/KR2023/002595, May 24, 2023.
(Continued)

*Primary Examiner* — Yosef K Laekemariam

(57) ABSTRACT

In one embodiment, a method includes maintaining a video communication between client devices with each being associated with a respective video stream, which is associated with a respective match scale measured based on a height of frames of the video stream and a depth of subjects within the frames, determining a respective scaling factor and cropping for each video stream, wherein the respective scaling factor is calculated based on the match scale associated with the corresponding video stream and a target match scale determined from the match scales associated with all video streams, and wherein the respective cropping is determined based on a uniformity of positions of the subjects within the frames across all video streams, generating a merged video stream from each video stream based on the respective scaling factor and cropping, and sending instructions for presenting the merged video stream to one or more of the client devices.

22 Claims, 21 Drawing Sheets

(51) Int. Cl.
  *G06V 40/10* (2022.01)
  *H04L 65/60* (2022.01)
  *H04N 5/262* (2006.01)
  *H04N 9/64* (2023.01)

(52) U.S. Cl.
  CPC ......... *H04N 5/2622* (2013.01); *H04N 5/2628* (2013.01); *H04N 9/646* (2013.01); *G06T 2207/10016* (2013.01); *G06T 2207/30196* (2013.01); *G06T 2207/30242* (2013.01)

(58) Field of Classification Search
  CPC ............. G06T 7/70; G06T 2207/10016; G06T 2207/30196; G06T 2207/30242; G06V 40/10; H04L 65/60
  See application file for complete search history.

(56) References Cited

U.S. PATENT DOCUMENTS

| | | | |
|---|---|---|---|
| 9,088,694 | B2 | 7/2015 | Navon |
| 9,167,275 | B1* | 10/2015 | Daily ................. H04N 21/2187 |
| 10,075,491 | B2 | 9/2018 | Smus |
| 10,362,272 | B1 | 7/2019 | van Os |
| 10,462,420 | B2 | 10/2019 | Cranfill |
| 10,721,440 | B2 | 7/2020 | Sugihara |
| 10,917,608 | B1 | 2/2021 | Faulkner |
| 10,951,947 | B2 | 3/2021 | Faulkner |
| 2011/0063440 | A1* | 3/2011 | Neustaedter ........... H04N 7/147 |
| | | | 348/143 |
| 2012/0026277 | A1 | 2/2012 | Malzbender |
| 2013/0194375 | A1 | 8/2013 | Michrowski |
| 2018/0032224 | A1 | 2/2018 | Cornell |
| 2018/0343294 | A1* | 11/2018 | Rands ............... G06F 16/24575 |
| 2019/0026874 | A1 | 1/2019 | Jin |
| 2019/0349512 | A1 | 11/2019 | Bently |
| 2020/0098096 | A1 | 3/2020 | Moloney |
| 2021/0081003 | A1 | 3/2021 | Bristol |
| 2021/0120157 | A1 | 4/2021 | Xu |
| 2021/0185208 | A1 | 6/2021 | Djakovic |
| 2022/0116435 | A1* | 4/2022 | Hartnett ................ H04L 65/765 |
| 2022/0116546 | A1 | 4/2022 | Chowdary |

OTHER PUBLICATIONS

Non-final office action in U.S. Appl. No. 17/725,466, Feb. 27, 2024.
Final office action in U.S. Appl. No. 17/725,466, May 31, 2024.
Notice of Allowance in U.S. Appl. No. 17/725,466, Aug. 5, 2024.
Extended European Search Report in Application No. 23792004.6-1207 / 4413725 PCT/KR2023002595, Dec. 16, 2024.

* cited by examiner

SYSTEMS AND METHODS FOR MULTI-USER VIDEO COMMUNICATION WITH ENGAGEMENT DETECTION AND ADJUSTABLE FIDELITY

TECHNICAL FIELD

This disclosure relates generally to database and file management within network environments, and in particular relates to video communications.

BACKGROUND

Standard video call systems are commonplace. They have a fixed start time and end time, and during this period they transmit video and audio between participants (either which can be enabled or disabled). They are used frequently between friends, family members, business calls (one to one), business meetings (group), and presentations (one to many). There are many different platforms with different features tailored to the use case, e.g., replacing a person's video with an avatar on a friend-focused platform, applying noise suppression in a gaming focused platform, or applying a virtual background to enhance privacy in a business focused platform. Some new always-on video communication systems are emerging that aim to avoid the standard video call start and end structure. These systems are primarily aimed at collaborative workplaces with the goal of reducing barriers between coworkers communicating.

DESCRIPTION OF EXAMPLE EMBODIMENTS

Mobile Client System Overview

Figure 1:
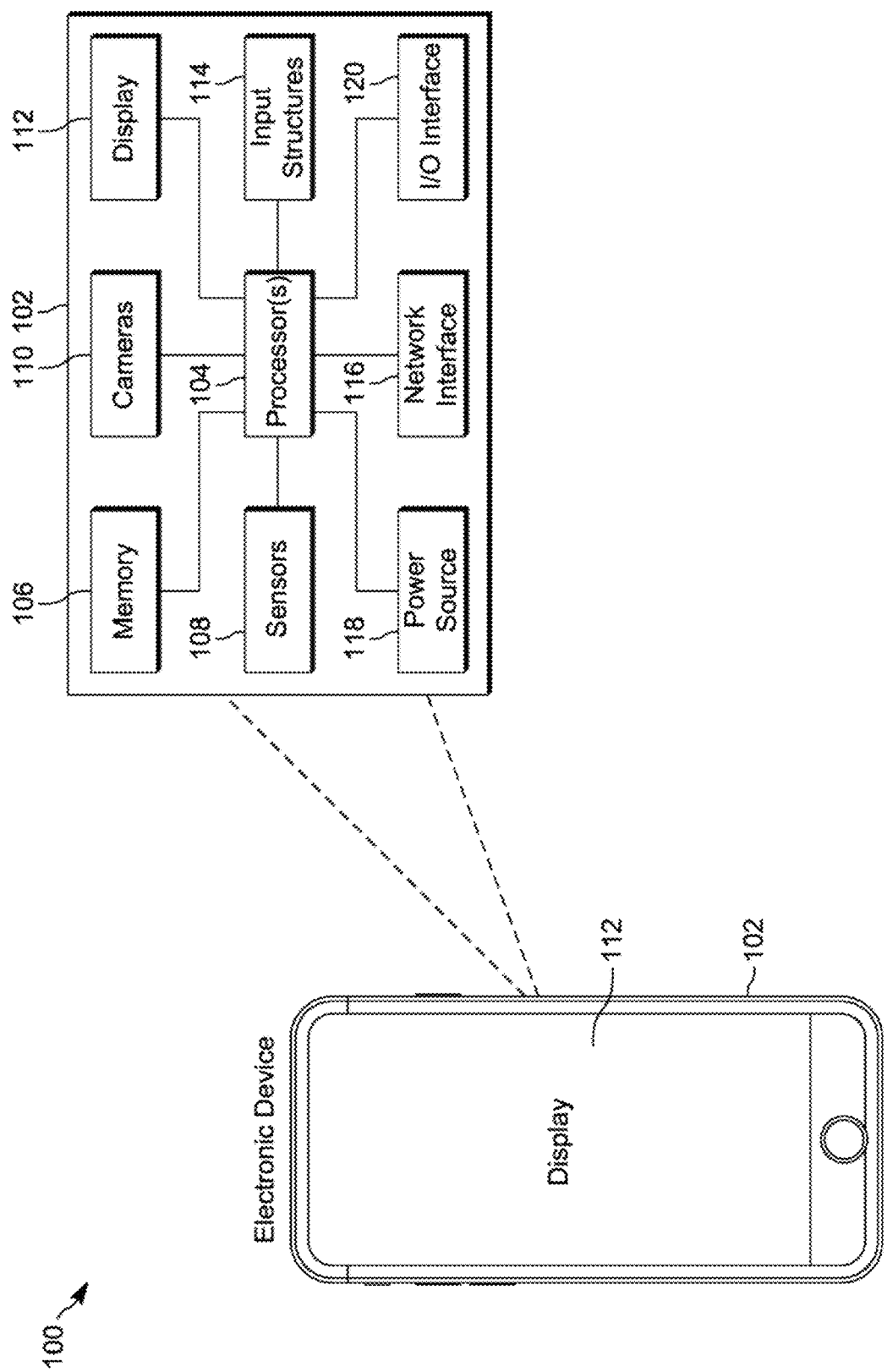
FIG. 1 illustrates an example electronic device.

FIG. 1 illustrates an example electronic device 100. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Multi-User Video Communication with Engagement Detection and Adjustable Fidelity Video calls have been increasingly used. They often have the overhead of prior scheduling via a text-based chat service, which may make them tend towards longer, more formal, less frequent conversations that expect full engagement from start to end. The video call format may be therefore better suited to some use cases more than others. A use case where the existing video call format is considerably deficient may be enabling the natural interactions that occur between people sharing common physical spaces, e.g., interactions between family members sharing a household. Interactions between close connections in a shared space may be comprised largely of short conversations, chance encounters, and shared presence. Existing video call systems may be not optimized for short conversations, may not enable chance encounters, and may not convey a sense of shared presence. One might suggest that a solution to recreate the experience of sharing a space with someone may be to set up a permanently connected video call. However, this approach may introduce a number of issues. Firstly, unwanted noise may be transmitted, such as the lawn mower, the kitchen mixer, etc. Secondly, conversations occurring in different rooms may be inadvertently transmitted. Thirdly, users may be concerned with oversharing and a lack of privacy. Fourthly, the camera and microphone may need adjusting depending on the area of interest. Lastly, excessive data may be transmitted through the users' internet connections. To address the aforementioned issues with a permanent video call, a video communication system disclosed herein may maintain connection between the spaces all of the time, encourage interaction and convey a sense of presence between users without the downsides that would otherwise be associated with a permanently connected video call. In particular embodiments, the video communication system may adjust the video communications fidelity or obfuscation in order to tune the connectedness of the users. The video communication system may also determine the user engagement with the video communication by analyzing the video and audio. For example, a business-focused communications platform may implement the video communication system, which may detect that someone has left their seat and in response, mute their microphone and blur their video. The video communication system may further improve the presentation of multiple video streams by filtering, transforming and positioning multiple video streams to appear as a unified scene and automatically adjusting the relative video stream sizes according to the content. In particular embodiments, the video communication system may include one or more cameras, one or more microphones, and one or more sensors to achieve desired outcomes. As an example and not by way of limitation, the sensors may include a three-dimensional (3D) or depth sensor (e.g., stereoscopic cameras, lidar sensor, ultrasonic depth sensor, etc.). Users may issue commands to the video communication system via one or more of a remote control, an application, a voice command, a gesture control, an overlay control, or a home automation control system.

In particular embodiments, an electronic device may maintain a video communication between two or more client devices. Each client device may be associated with a respective video stream in the video communication. Each video stream may be associated with a respective match scale measured based on a height of frames of the video stream and a depth of subjects within the frames. In particular embodiments, the electronic device may determine, for each of the video streams, a respective scaling factor and a respective cropping. The respective scaling factor may be calculated based on the match scale associated with the corresponding video stream and a target match scale determined from the match scales associated with the video streams associated with the two or more client devices. The respective cropping may be determined based on a uniformity of positions of the subjects within the frames across the video streams associated with the two or more client devices. In particular embodiments, the electronic device may generate, based on the respective scaling factor and cropping of each video stream, a merged video stream from each of the video streams for the video communication. The electronic device may further send, to one or more of the client devices, instructions for presenting the merged video stream.

Certain technical challenges exist for improving the presentation of multiple video streams in a video communication. One technical challenge may include effectively detecting levels of engagement of the participants. The solution presented by the embodiments disclosed herein to address this challenge may be detecting the levels of engagement from inputs including presence and location, body and head directions, pose, voice, direction from which the voice arrived, etc., as these inputs provide comprehensive information that are useful for categorizing each video stream into a correct level of engagement. Another technical challenge may include accurately calculating a scaling factor for each video stream. The solution presented by the embodiments disclosed herein to address this challenge may be calculating the scaling factor based on vertical distance at subject (VDAS) which indicates a video frame's total height in meters at the depth of a subject (person) within the video frame as the resulted scaling factor may enable the video communication system to scale each image such the true distance-per-pixel (at the depth of the subject) may be the same value for all video streams, thereby giving the impression that the subjects are the same distance from the camera in the unified scene.

Certain embodiments disclosed herein may provide one or more technical advantages. A technical advantage of the embodiments may include avoidance of oversharing and privacy protection as the video communication system may adaptively adjust fidelity or obfuscation of a video stream in a video communication based on connectedness of corresponding participants. Another technical advantage of the embodiments may include presenting multiple video streams in a video communication as a unified scene after the video communication system scales, filters, transforms and positions these video streams. Another technical advantage of the embodiments may include automatically adjusting the relative video stream sizes according to the content as the video communication system may allocate appropriate space for each video stream based on participant count, engagement, and activity level. Certain embodiments disclosed herein may provide none, some, or all of the above technical advantages. One or more other technical advantages may be readily apparent to one skilled in the art in view of the figures, descriptions, and claims of the present disclosure.

Figure 2:
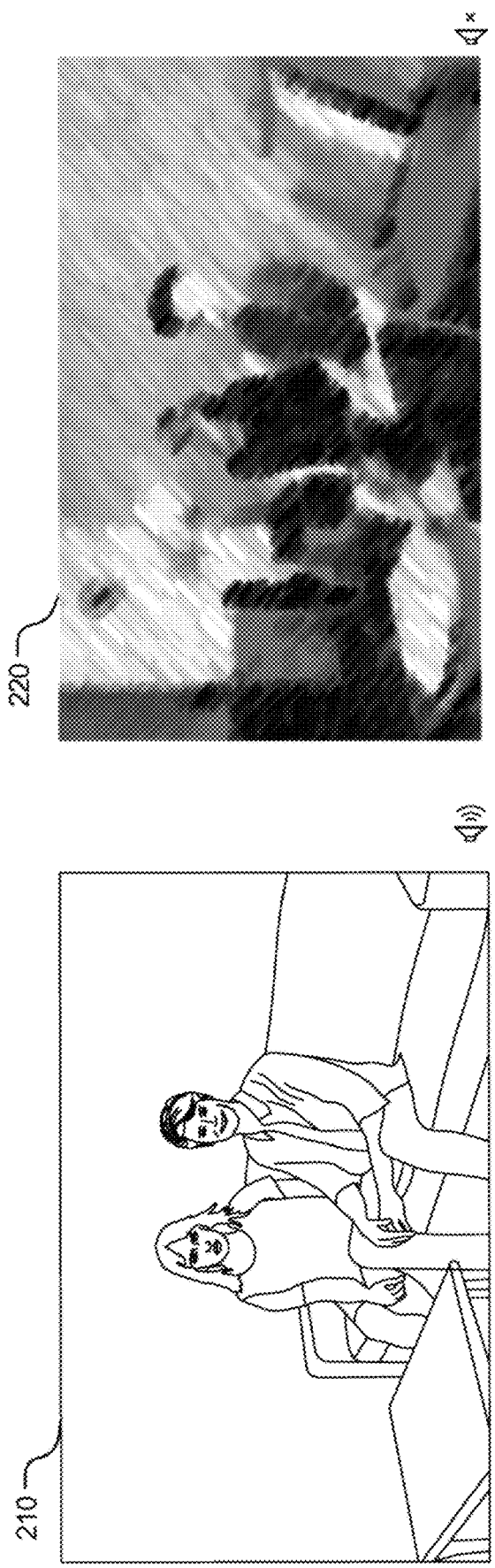
FIG. 2 illustrates an example comparison between a high-fidelity video and a low-fidelity video.

In particular embodiments, the video communication system may determine, for each of the video streams, a respective fidelity based on one or more of a date and time associated with the corresponding video stream, a calendar of a participant associated with the corresponding video stream, a command from the participant associated with the corresponding video stream, or a degree of engagement of the participant associated with the video stream. Accordingly, generating the merged video stream may be further based on the respective fidelity associated with each of the video streams. The video communication system may transmit and present video and audio with varying degrees of fidelity to adjust how well connected the users are. The fidelity may be chosen by the user, or it may be automatically determined using a range of video and audio analysis techniques. High-fidelity communication may include clear video and clear audio, as compared to existing video calls. Lower fidelity audio may be obfuscated to a varying degree (e.g., muffling), represented visually, or completely removed. Lower fidelity video may be obfuscated to a varying degree (e.g., blurring) or entirely replaced by a visualization. High-fidelity communication may be most appropriate when the users are fully engaged and actively communicating via the system. Lower fidelity communications may be most appropriate when the users are less engaged with the system or when privacy should be enforced. In particular embodiments, the video communication system may determine the fidelity chosen based on a number of different inputs. As an example and not by way of limitation, these inputs may include, but not limited to, day and time which may be compared with a user editable schedule, a user's digital calendar (e.g., the fidelity may be limited when the user has a meeting or appointment), user commands, and detected engagement of users. FIG. 2 illustrates an example comparison between a high-fidelity video and a low-fidelity video. The high-fidelity video 210 may be clearer visually and have audio. The low-fidelity video 220 may be blurred and not have audio. As a result, the video communication system may have a technical advantage of avoidance of oversharing and privacy protection as the video communication system may adaptively adjust fidelity or obfuscation of a video stream in a video communication based on connectedness of corresponding participants.

In particular embodiments, the video communication system may determine, for each of the video streams, a respective degree of engagement of a participant associated with the corresponding video stream based on one or more of the participant's presence, the participant's location, the participant's body direction, the participant's head direction, the participant's pose, or the participant's voice. Accordingly, generating the merged video stream may be further based on the respective degree of engagement of the participant associated with each of the video streams. The video communication system may automatically determine the engagement of users from different inputs. For example, these inputs may include person(s) presence and location, person(s) body and head directions, person(s) pose, voice detection, direction from which the voice arrived, etc. Detecting the levels of engagement from inputs including presence and location, body and head directions, pose, voice, direction from which the voice arrived, etc., may be an effective solution for addressing the technical challenge of effectively detecting levels of engagement of the participants as these inputs provide comprehensive information that are useful for categorizing each video stream into a correct level of engagement.

Figure 3:
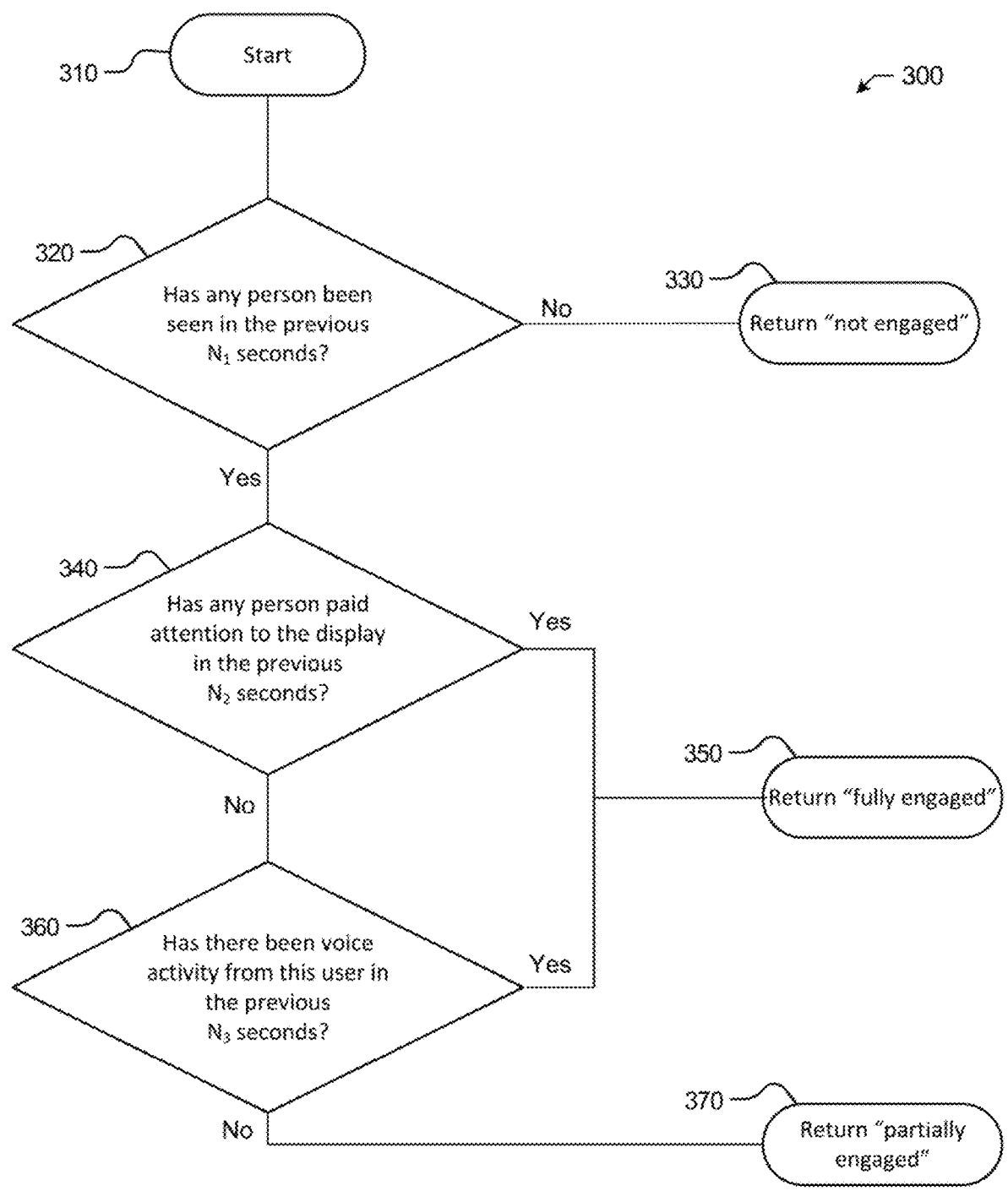
FIG. 3 illustrates an example flow chart for determining the level of engagement at a particular device.

FIG. 3 illustrates an example flow chart 300 for determining the level of engagement at a particular device. The level of engagement may be simplified into three categories: fully engaged, partially engaged, and not engaged. The example flow chart 300 starts at step 310. At step 320, the video communication system may determine whether any person has been seen in the previous $N_1$ seconds. If not, the video communication system may return "not engaged" at step 330. If yes, the video communication system may determine whether any person has paid attention to the display in the previous $N_2$ seconds at step 340. If yes, the video communication system may return "fully engaged" at step 350. If no, the video communication system may determine whether there has been voice activity from this user in the previous $N_3$ seconds at step 360. If yes, the video communication system may return "fully engaged" at step 350. If no, the video communication system may return "partially engaged" at step 370. Note that $N_1$, $N_2$, and $N_3$ may be constants that determine how much time the video communication system reports higher engagement levels following some activity. For example, they may all be set to 60 seconds such that any presence, voice, or attention may impact the output for the next minute.

In particular embodiments, the video and audio fidelity transmitted from a device may be chosen according to the level of engagement. As an example and not by way of limitation, for "fully engaged", the video communication system may transmit high fidelity video and audio (e.g., no obfuscation). As another example and not by way of limitation, for "partially engaged", the video communication system may transmit low fidelity video and audio (e.g., partial obfuscation). As yet another example and not by way of limitation, for "not engaged", the video communication system may transmit no audio or video.

In particular embodiments, the video communication system may merge video streams into a unified scene. The video communication system may be used in groups, where the group size is two or more. When multiple video streams are presented on the same display, the video streams may be automatically adjusted such that the overall display appears as a unified scene rather than a collection of video streams. In other words, the participants may appear to be occupying the same space on the display, rather than a collection of windows. These adjustments may include, but not limited to, brightness, color, perspective, position (e.g. align heads), and blurring of the edges. In addition, the relative frame size of each video stream may be adjusted according to the subjects and activity level of the video stream. For example, a video stream with three people in it may be allocated a larger proportion of the screen than a video stream with one person. As a result, the group video call experience may be vastly improved.

Figure 4A:
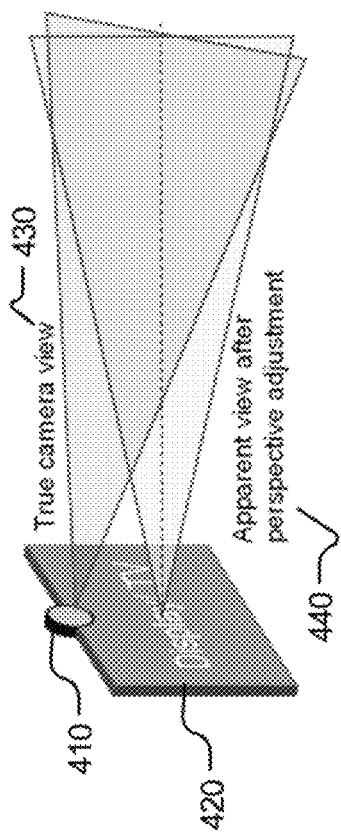
FIGS. 4A-4B illustrate an example perspective adjustment.
Figure 4B:
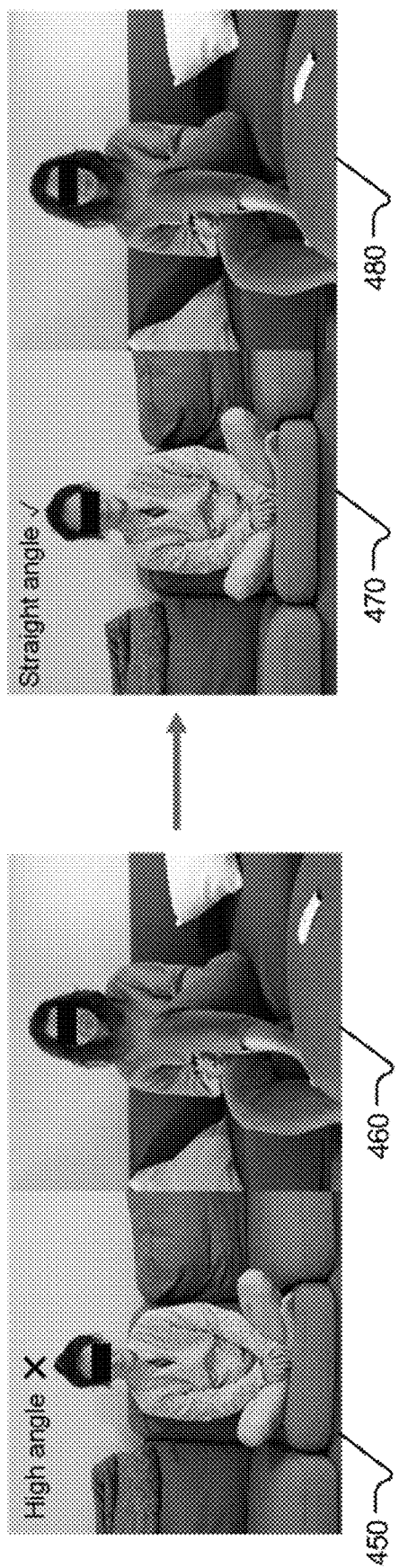

In particular embodiments, the video communication system may determine, for each of the video streams, a respective adjustment of perspective associated with the corresponding video stream to center the subjects within the frames of the corresponding video stream. Accordingly, generating the merged video stream into a unified scene may be further based on the respective adjustment of perspective associated with each of the video streams. In alternative embodiments, the video communication system may use depth information (e.g., from either a 3D/depth sensor or other method) to de-skew the frames of a video stream. The video communication system may transform the video streams such that the camera appears to be located at the center of the display. FIGS. 4A-4B illustrate an example perspective adjustment. In FIG. 4A, a video camera 410 may be mounted on top of a display/TV 420. After perspective adjustment, the true camera view 430 may become the apparent view 440. In FIG. 4B, the original images 450-460 with a high angle may become adjusted images 470-480 with a straight angle after perspective adjustment. More information on assisting users subject to privacy settings may be found in U.S. patent application Ser. No. 16/741,630, filed 13 Jan. 2020, which is incorporated by reference. More information on perspective adjustment may be found in U.S. patent application Ser. No. 17/666,027, filed 7 Feb. 2022, which is incorporated by reference.

Figure 5:
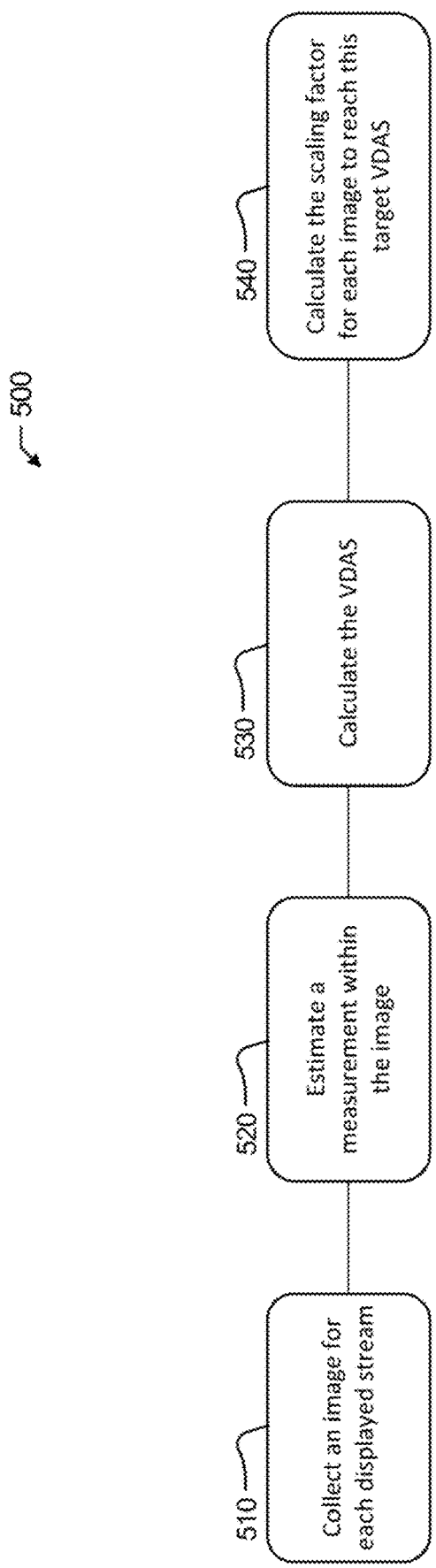
FIG. 5 illustrates an example process for calculating the scaling factors for each displayed video stream.

In particular embodiments, the video communication system may merge video streams into a unified scene based on a match scale. The video communication system may scale the video streams such that each person appears to be a consistent distance from the camera. For brevity, we introduce a term vertical distance at subject (VDAS) as a match scale. VDAS may indicate a video frame's total height in meters at the depth of a subject (person) within the video frame. With the match scale, the video communication system may scale each image such the true distance-per-pixel (at the depth of the subject) may be the same value for all video streams. This may give the impression that the subjects are the same distance from the camera in the unified scene. FIG. 5 illustrates an example process 500 for calculating the scaling factors for each displayed video stream. At step 510, the video communication system may collect an image for each displayed stream. At step 520, the video communication system may estimate a measurement within the image. At step 530, the video communication system may calculate the VDAS. At step 540, the video communication system may calculate the scaling factor for each image to reach the target VDAS. Subsequent images from each stream may then be scaled according to these scaling factors. Calculating the scaling factor based on vertical distance at subject (VDAS) which indicates a video frame's total height in meters at the depth of a subject (person) within the video frame may be an effective solution for addressing the technical challenge of accurately calculating a scaling factor for each video stream, as the resulted scaling factor may enable the video communication system to scale each image such the true distance-per-pixel (at the depth of the subject) may be the same value for all video streams, thereby giving the impression that the subjects are the same distance from the camera in the unified scene.

Figure 6:
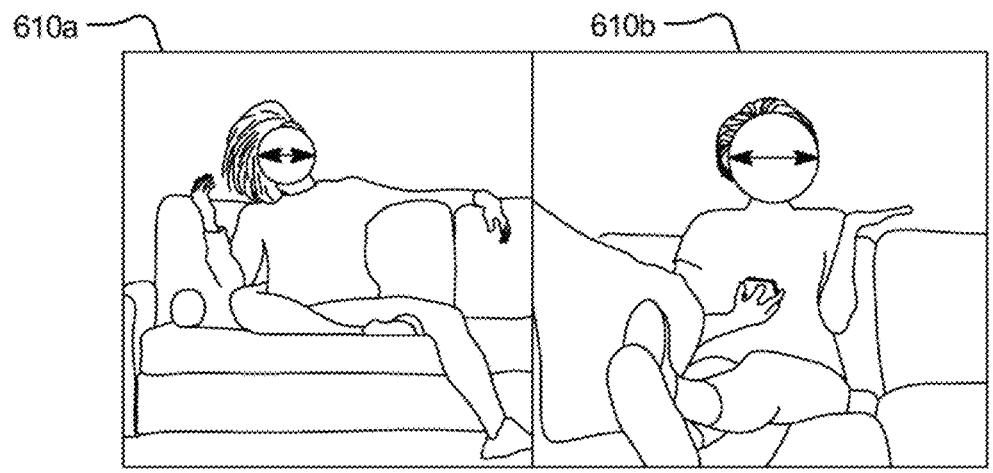
FIG. 6 illustrates example assumptions of lengths of visible content.
Figure 6:
Figure 6:
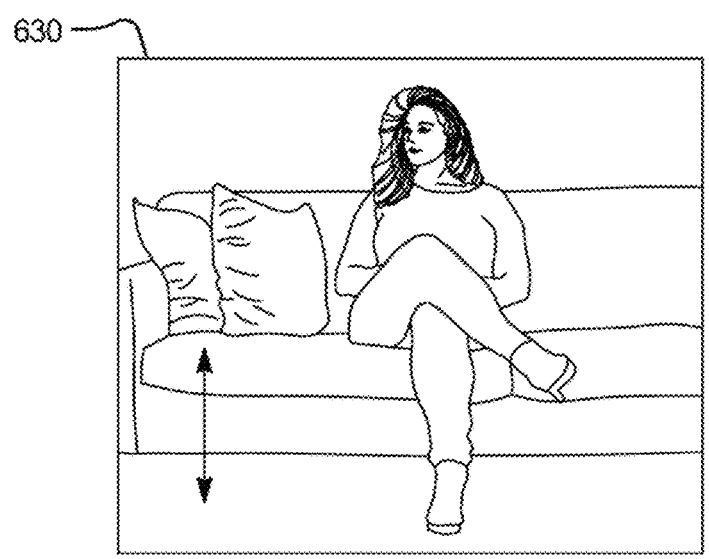

To determine VDAS, the video communication system may first estimate a measurement within the image. For each image, a true measurement (in meters) may be estimated at the depth of the subject (i.e., person). If 3D information is available, we may choose two points that lie within the subject and calculate the straight-line distance between those points in 3D space. If 3D information is not available, we may assume a length of something visible within the image. FIG. 6 illustrates example assumptions of lengths of visible content. For images 610a-610b, we assume the head width to be X meters. Whilst head sizes vary between people, they may provide a rough sense of scale from an image. For images 620a-620b, we assume the interpupillary distances (IPD) to be X meters. The standard deviation for IPD in people may be only about 6%, making it a reasonably consistent scale. For images 630, we assume the height of furniture to be X meters. The subjects may usually be on a seat, and seat heights may be relatively standardized. Hence, we may assume that the subject's seat is a standard size. Note other methods may be used to estimate a measurement in the image, including a combination of methods.

Figure 7B:
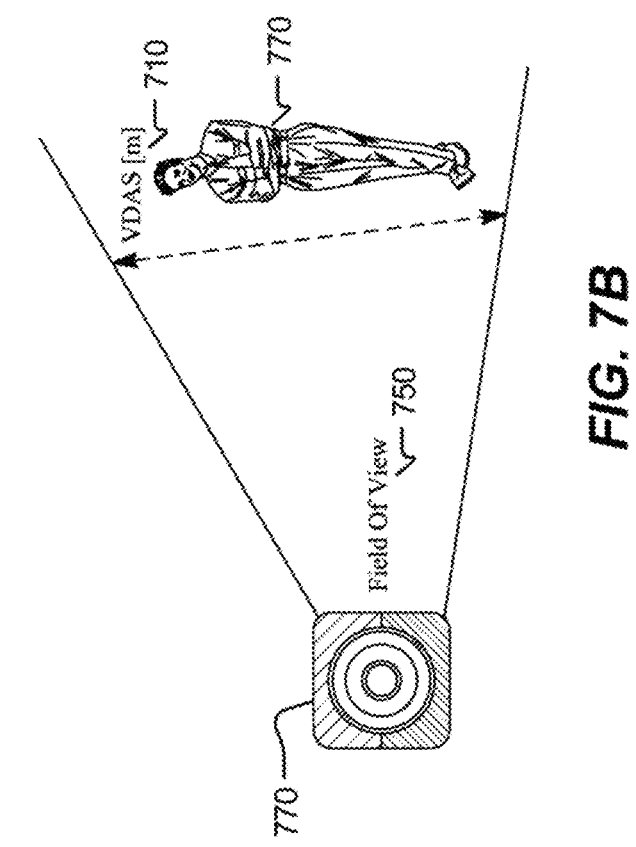
FIG. 7B illustrates an example visualization of vertical distance at a subject.
Figure 7A:
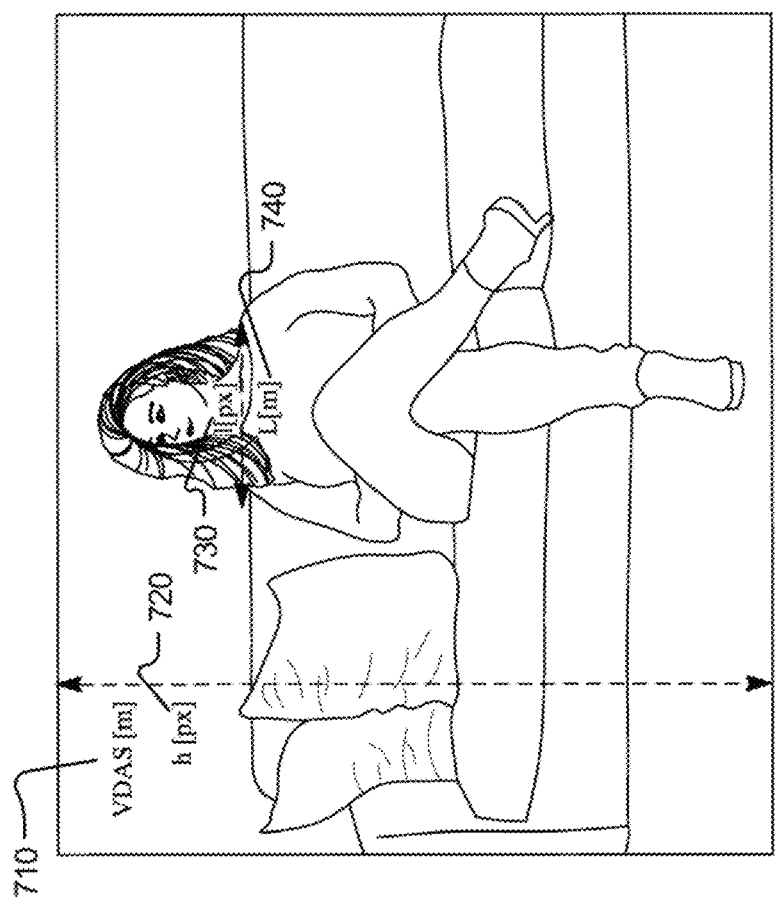
FIG. 7A illustrates an example measurement of vertical distance at a subject.

For the estimated measurement within the image, the video communication system may then calculate the number of pixels occupied by the same length. The video communication system may then calculate VDAS for each image as:

$$VDAS = h\frac{L}{l} \quad (1)$$

where h is the image height in pixels, L is the measurement length in meters, and l is the measurement length in pixels. Note that the distance-per-pixel is L/l. FIG. 7A illustrates an example measurement of vertical distance at a subject. As may be seen, VDAS (in meters) 710 may be determined based on h 720 which is the image height in pixels, L 730 which is the measurement length in meters, and l 740 which is the measurement length in pixels. FIG. 7B illustrates an example visualization of vertical distance at a subject. Within the field of view 750 of the camera 770, VDAS (in meters) 710 may characterize the depth of the subject 770.

The video communication system may further calculate the scaling factor for each stream. All streams may be scaled up such that they have the same true distance per pixel (at the depth of the subject). There may be a VDAS for each stream. The video communication system may choose the lowest VDAS value from all of the streams, i.e., $VDAS_{min}$. The scaling factor for each stream may be calculated as $$s_i = \frac{VDAS_i}{VDAS_{min}}. \quad (2)$$

Figure 8:
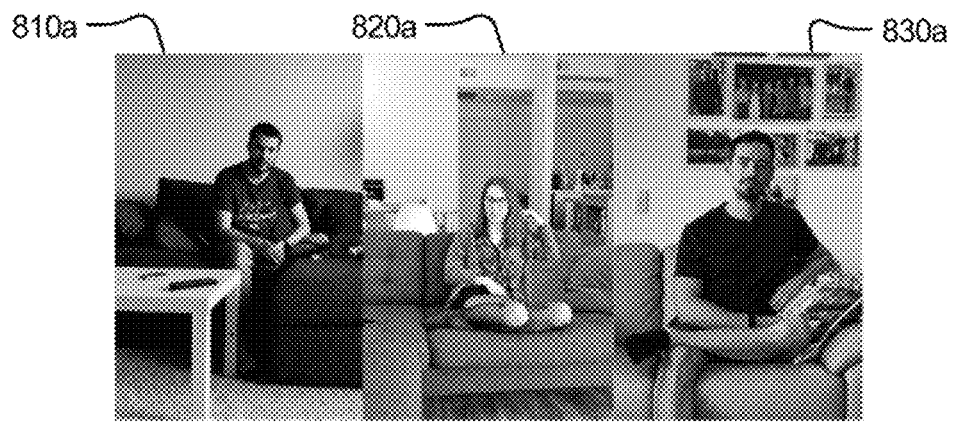
FIG. 8 illustrates an example scaling of images.
Figure 8:

All future images on each stream may then be multiplied by the stream's scaling factor to achieve a similar sense of scale between images. After scaling, all images may have the same distance-per-pixel. FIG. 8 illustrates an example scaling of images. Images 810a-830a are associated with the same video communication and are before scaling. After scaling, image 810a may become image 810b with a scaling factor of 1.40. Image 820a may become image 820b with a scaling factor of 1.47. Image 830a may become image 830b with a scaling factor of 1.00.

Figure 9:
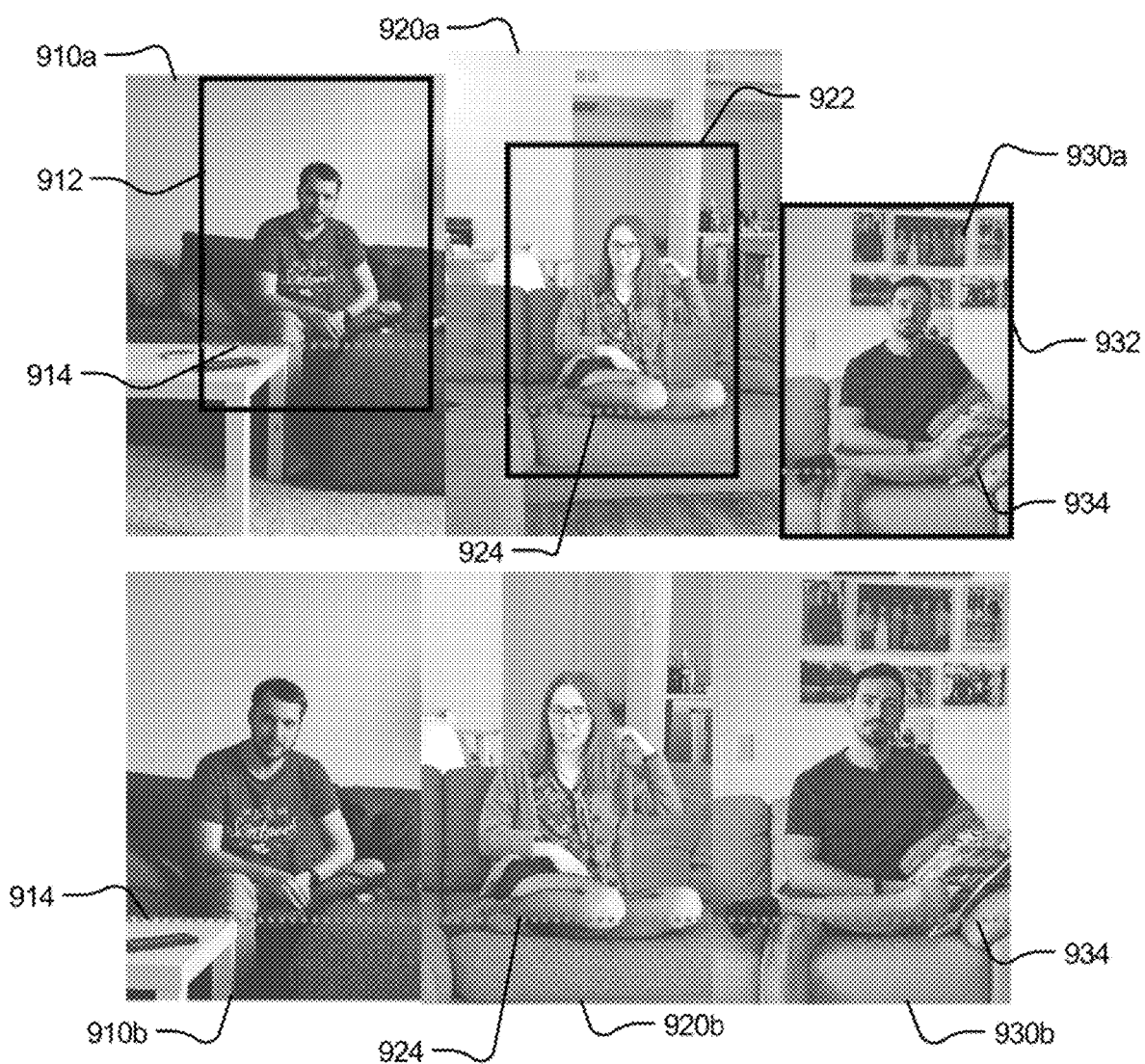
FIG. 9 illustrates example crop of images.

In particular embodiments, the video communication system may merge video streams into a unified scene additionally based on cropping and positioning. Due to potential differences in the sizes and scaling, the video streams may be of different sizes. As a result, the video communication system may determine the crop heights, widths, and positions. Note that the crop heights may need to be equal. As the distance-per-pixel is known during the calculation of the scaling factor, the video communication system may choose the target output VDAS in meters and then calculate the crop height in pixels. This may be the same for all images. In particular embodiments, the video communication system may choose this target VDAS to be as close as possible to an ideal value (e.g., 1.5 meters). The target value may be adjusted based on the activity level. For example, with high activity, the target value may be a larger value. The target value may be limited by the size of each image. For example, if the ideal value is 1.5 meters yet one of the images has a VDAS of 1.3 meters, then the target value may be changed to 1.3 meters. The crop height in pixels may be the target VDAS divided by the distance-per-pixel. The default crop width of each stream may be the total display width divided by the number of displayed streams. However, the crop widths of each streams may be adjusted based on the content within each stream. For each stream, the horizontal position of the crop may be chosen to be centered around the person(s) in view. For each stream, the vertical position of the crop may be chosen to achieve uniformity in the ground position underneath the person(s). The ground underneath each person may not be visible, so a suitable alternative may be to choose the crop vertical position such that the seat heights are uniform. In particular embodiments, the cropping may comprise zooming, such as zooming in or out and then cropping. FIG. 9 illustrates example crop of images. Images 910a-930a are associated with the same video communication and are before cropping. The video communication system may determine a crop 912 and a crop vertical position 914 for image 910a, a crop 922 and a crop vertical position 924 for image 920a, and a crop 932 and a crop vertical position 934 for image 930a. After cropping, images 910a, 920a, and 930a may become images 910b, 920b, and 930b, respectively. As may be seen, images 910b-930b may the seat heights the same for the three participants of the video communication.

In particular embodiments, the video communication system may determine, for each of the video streams, a respective adjustment of color and lighting associated with the corresponding video stream based on a consistency of visual characteristics across the video streams. Accordingly, generating the merged video stream may be further based on the respective adjustment of color and lighting associated with each of the video streams. As an example and not by way of limitation, the video communication system may adjust the white balance, brightness, saturation, and other image characteristics to be consistent among the camera streams using the viewers' room color tone and exposure values.

Figure 10:
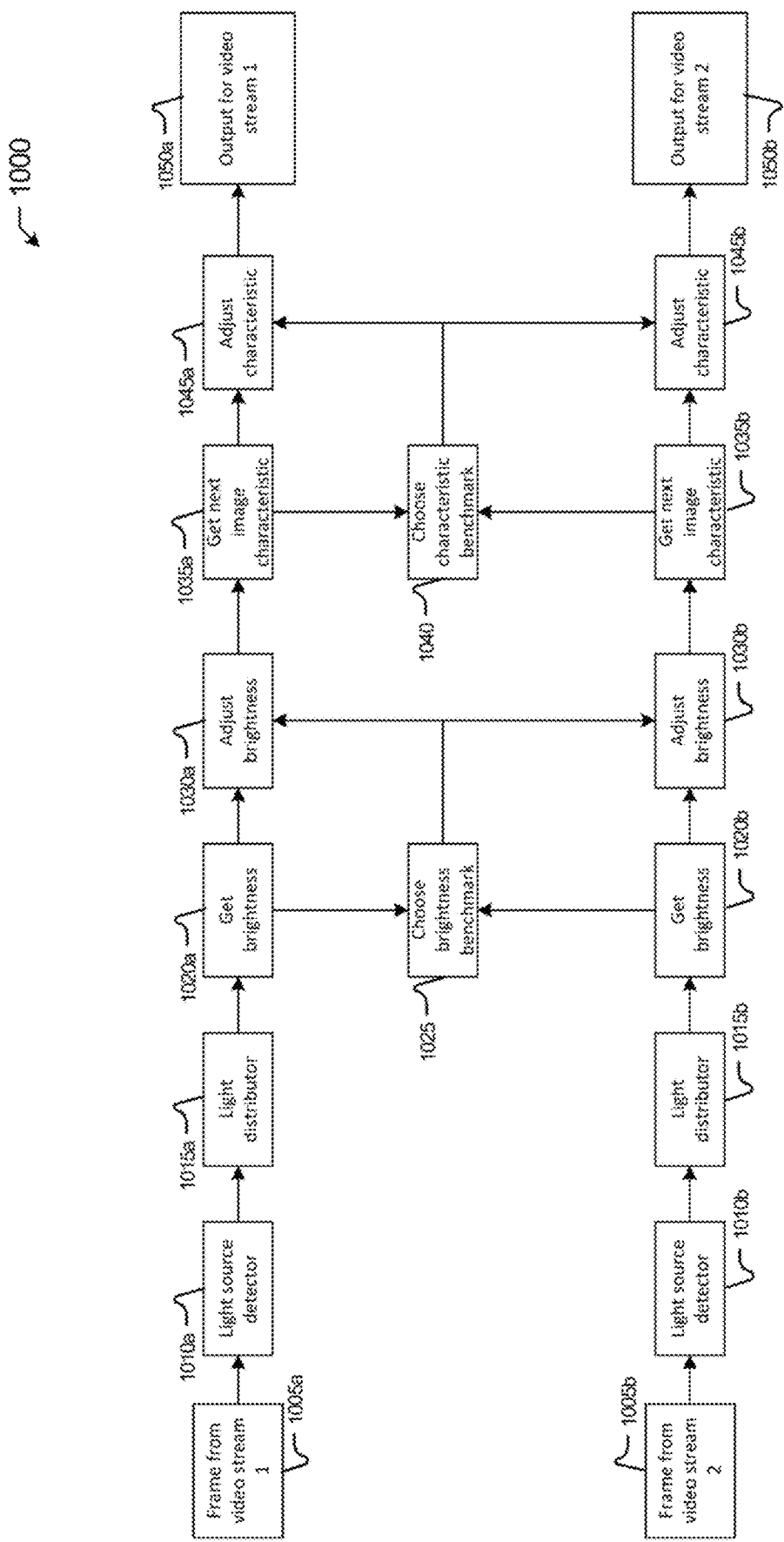
FIG. 10 illustrates an example block diagram for adjusting color and lighting.

FIG. 10 illustrates an example block diagram 1000 for adjusting color and lighting. Although the example block diagram 1000 is based on merging two video streams, the principle may be extended to merging any suitable number of video streams. In other words, this pipeline may run periodically (e.g., once per minute) or when new user joins and remainder of the frames from that minute may be processed by same benchmark values from the pipeline output. At step 1005a/b, the video communication system may access the frame from video stream 1 and video stream 2, respectively. At step 1010a/b, the video communication system may apply a light source detector to video stream 1 and video stream 2, respectively. Light source detector may be for detecting position and relative intensity of light source in an image. At step 1015a/b, the video communication system may apply a light distributor to video stream 1 and video stream 2, respectively. Once the light source is predicted, the video communication system may use that information to evenly redistribute light on the image. At step 1020a/b, the video communication system may get brightness for video stream 1 and video stream 2, respectively. At step 1025, the video communication system may choose brightness benchmark. Specifically, the video communication system may get brightness from frames of different video streams (e.g., video stream 1 and video stream 2), average the brightness or choose 1 as the brightness benchmark. This step may also consider the outdoor lighting using user's local time, latitude, longitude and weather condition. If the outdoor lighting conditions are similar across different users after evaluation, an average benchmark may be better. At step 1030a/b, the video communication system may adjust brightness for video stream 1 and video stream 2, respectively. At step 1035a/b, the video communication system may get next image characteristic for video stream 1 and video stream 2, respectively. At step 1040, the video communication system may choose characteristic benchmark. At step 1045a/b, the video communication system may adjust characteristic for video stream 1 and video stream 2, respectively. The video communication system may repeat the process comprising steps 1035-1045 for all desired characteristics. As an example and not by way of limitation, such characteristics may include, but not limited to, brightness, highlight brightness, shadow brightness, contrast, saturation, color temperature, etc. At step 1050a/b, the video communication system generate output for video stream 1 and video stream 2, respectively. In particular embodiments, the output may comprise modified frame and benchmark values.

Figure 11:
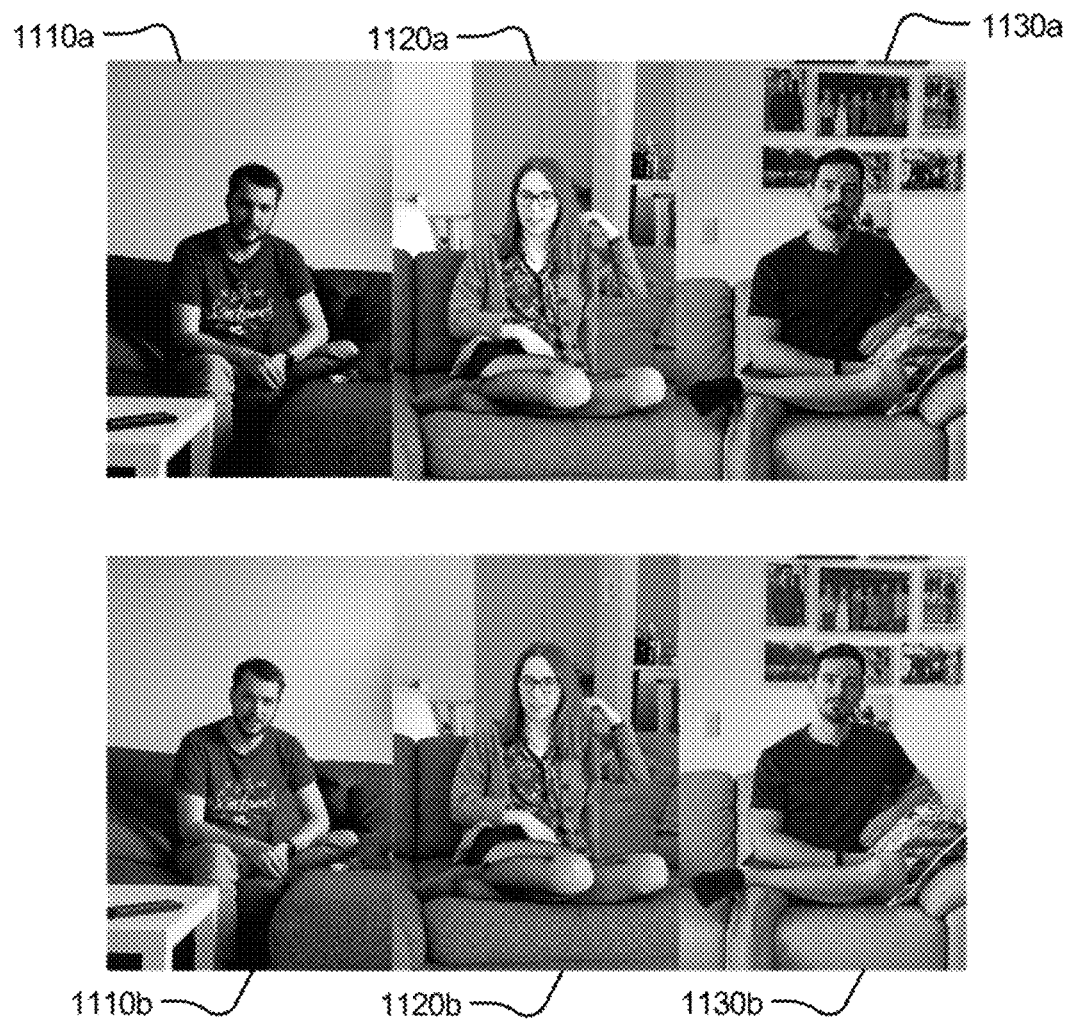
FIG. 11 illustrates example frames with color and lighting adjustment.

FIG. 11 illustrates example frames with color and lighting adjustment. Images 1110a-1130a are associated with the same video communication and are before adjustment of color and lighting. The video communication system may adjust image 910a to image 910b based on the adjustments of temperature +30, exposure +11, highlights −30, and shadows +60. The video communication system may adjust image 920a to image 920b based on the adjustment of temperature −30 and highlights −25. The video communication system may adjust image 930a to image 930b based on the adjustment of brightness +8, saturation +20, and shadows +50.

Figure 12:
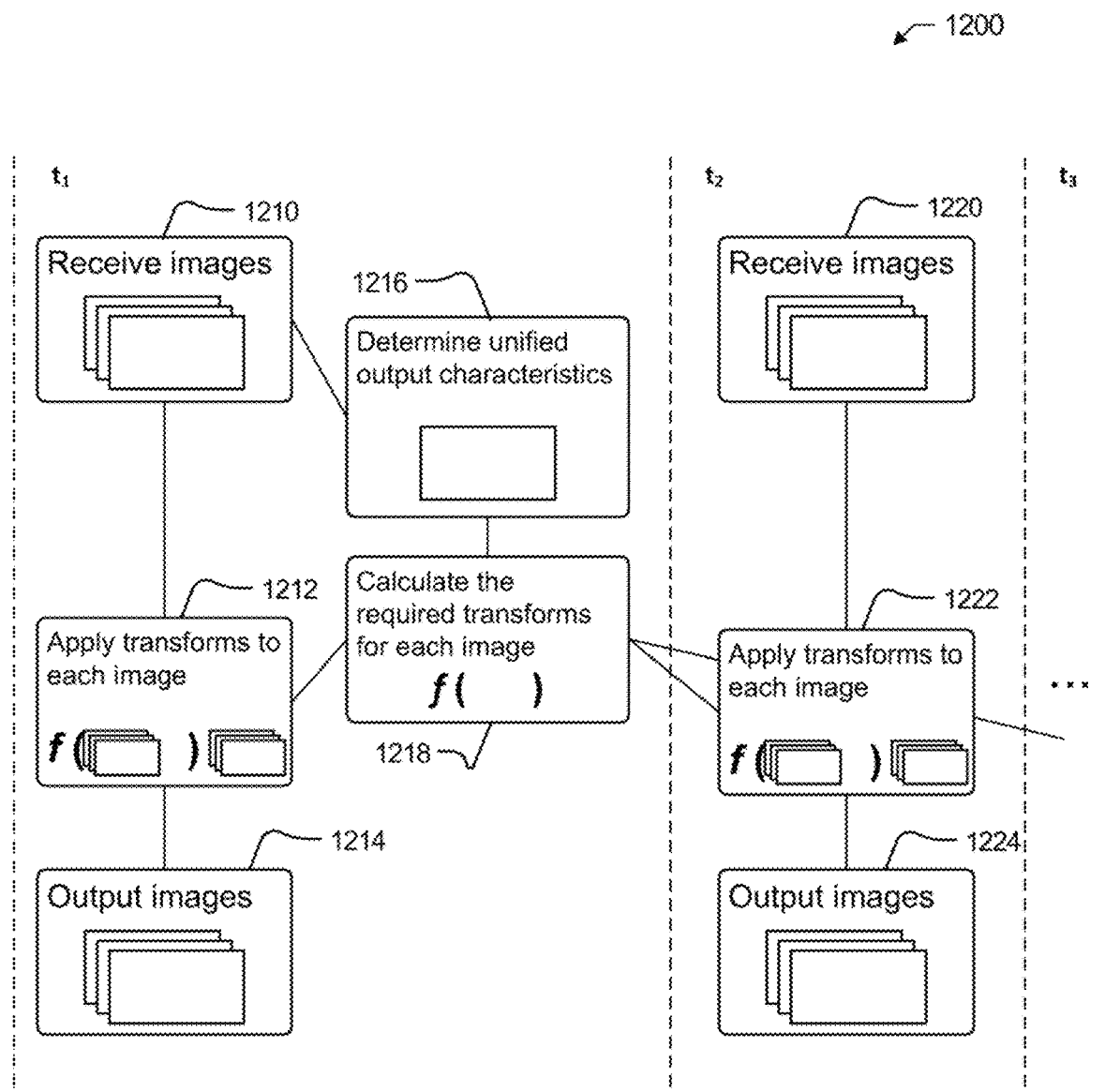
FIG. 12 illustrates an example block diagram for implementing image unification.

In particular embodiments, the video communication system may identify borders between any two of the video streams. Accordingly, generating the merged video stream may comprise blurring or blending the identified borders. The borders between video streams may be made less apparent by blurring or blending the streams into each other. FIG. 12 illustrates an example block diagram 1200 for implementing image unification. This example block diagram 1200 may indicate how the scene unification can be applied. Note that the transforms may be not calculated for every set of images. They may only need to be calculated at the start, or when there is a significant change.

At time $t_1$, the video communication system may perform the followings steps. At step 1210, the video communication system may receive the first set of images. Specifically, the video communication system may receive one frame from each video that is being displayed. At step 1212, the video communication system may apply transform to each image. At step 1214, the video communication system may generate output images. At step 1216, the video communication system may determine unified output characteristics. In particular embodiments, the video communication system may choose them to be visually appealing, whilst also minimizing the total amount of change. For example, if all input images have warm color tones, the video communication system may choose a warm color tone as the desired output. The output characteristics may include parameters to specify color, lighting, perspective, person scale, etc. At step 1218, the video communication system may calculate the required transforms for each image. In particular embodiments, the video communication system may determine the transformations required such that the image has the desired output characteristics. For example, the video communication system may increase brightness, change color temperature, offset vertically, etc.

At time $t_2$, the video communication system may perform the following steps. At step 1220, the video communication system may receive the second set of images. At step 1222, the video communication system may apply transforms to each image. In other words, each image may have its own transform applied. At step 1224, the video communication system may generate output images which are prepared and ready to be arranged or tiled for display. At time $t_3$, the video communication system may perform steps similar to those at time $t_2$.

Figure 13:
FIG. 13 illustrates an example blending of borders.

FIG. 13 illustrates an example blending of borders. Images 1310-1330 are associated with the same video communication and are before their borders being blended. The video communication system may blend their borders to get a unified display 1340.

After the video communication system scales, filters, transforms and positions these video streams as described before, the video communication system may have another technical advantage of presenting multiple video streams in a video communication as a unified scene.

Figure 14A:
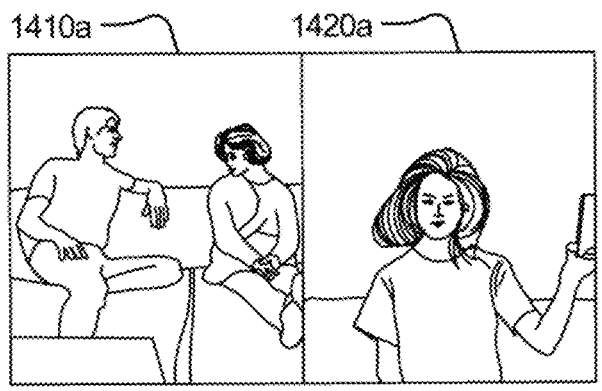
FIGS. 14A-14C illustrates example cases where the stream sizes may be adjusted for a better group call experience.
Figure 14A:
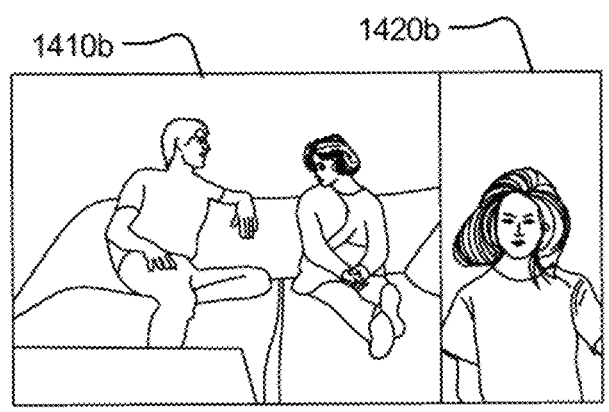
Figure 14B:
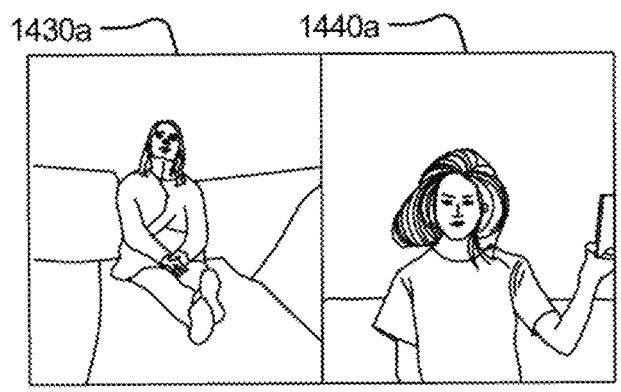
Figure 14B:
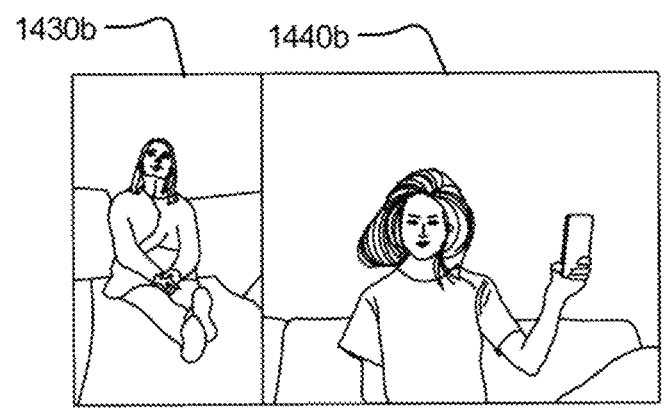
Figure 14C:
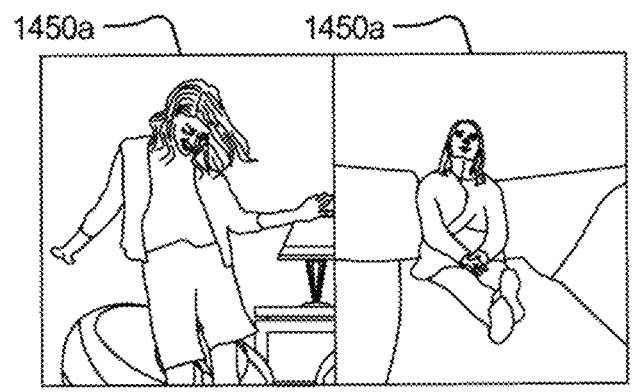
Figure 14C:
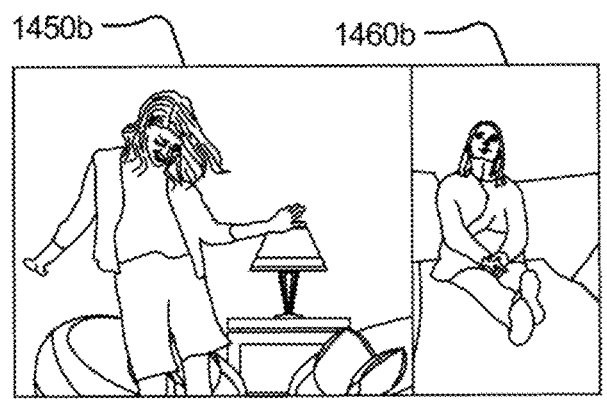

In particular embodiments, the video communication system may determine, for each of the video streams, a respective adjustment of space allocation associated with the corresponding video stream based on one or more of a count of participants present in the corresponding video stream, a degree of engagement of a participant in the corresponding video stream, or an activity level of a participant in the corresponding video stream. Accordingly, generating the merged video stream may be further based on the respective adjustment of space allocation associated with each of the video streams. In other words, the video communication system may further improve the presentation of multiple video streams by automatically adjusting video stream sizes. Depending on the content within each stream, it may be advantageous to allocate more space to certain streams. The relevant information may be automatically detected by video analysis, including person and pose detection. FIGS. 14A-14C illustrates example cases where the stream sizes may be adjusted for a better group call experience. FIG. 14A illustrates an example case where the stream sizes are adjusted based on person count. The more people that are present in a video stream, the more area may be allocated for that video stream. The original video streams may be video stream 1410a and video stream 1420a. Since there are people in video stream 1410a than in video stream 1420a, the video communication system may adjust their stream sizes to result in video stream 1410b and video stream 1420b. FIG. 14B illustrates an example case where the stream sizes are adjusted based on engagement. The video communication system may allocate less area for a video stream when participants associated with that video stream are not engaged or paying attention to the video communication. The original video streams may be video stream 1430a and video stream 1440a. Since the person in video stream 1430a is not paying attention to the video communication as compared to the person in video stream 1440a, the video communication system may adjust their stream sizes to result in video stream 1430b and video stream 1440b. FIG. 14C illustrates an example case where the stream sizes are adjusted based on activity level. The video communication system may allocate more space for a video stream when participants associated with that video stream are moving, e.g., a child showing a dance routine. The original video streams may be video stream 1450a and video stream 1460a. Since the person in video stream 1450a is dancing whereas the person in video stream 1460a is sitting still, the video communication system may adjust their stream sizes to result in video stream 1450b and video stream 1460b. The video communication system may have another technical advantage of automatically adjusting the relative video stream sizes according to the content as the video communication system may allocate appropriate space for each video stream based on participant count, engagement, and activity level.

In particular embodiments, the video communication system may enable a user to control their video stream. Gestures may be used to issue commands to the video communication system. These gestures may be recognized by analyzing the output of one or more sensors such as a camera, lidar, or event camera. The analysis may be computed locally on the gesture-performer's device or remotely on a server. Gestures may be used in combinations with voice commands. In particular embodiments, a user may use gestures to turn off privacy filters. For example, the user may raise a hand. A user interface (UI) may appear to indicate the gesture recognition, e.g., "hold your hand for one second." The UI may also provide visual cue, such as time counting down or progress bar. After gesture recognition, the video communication system may turn off the privacy filters. In particular embodiments, a user may use gestures to turn on privacy filters. For example, the user may raise a hand and start waving. The user may additionally say some words such as "bye", "see you next time", "goodbye", "good night", etc. After a few seconds, the video communication system may turn on the privacy filters. In particular embodiments, the user may use may use gestures to highlight the video stream from their camera on other users' screen. For example, the user may perform a gesture pushing the walls away, which may trigger the video communication system to make the video stream from the user's camera in full screen.

Figures 15A, 15B, 15C:
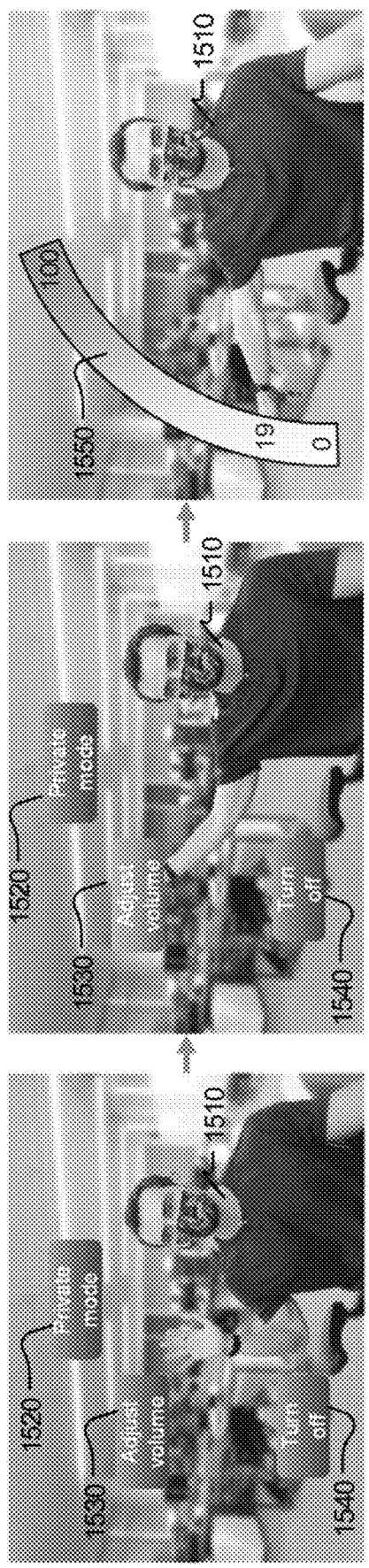
FIGS. 15A-15C illustrate an example interactive video overlay control.

In particular embodiments, the video communication system may provide a user with interactive video overlay control. The video overlay may be controlled by movement of the user (e.g., hand placement, limb placement, body placement, gestures, expressions, head direction, eye direction, etc.). FIGS. 15A-15C illustrate an example interactive video overlay control. FIG. 15A illustrates an example gesture to trigger an overlay menu. User 1510 may use a gesture such as a still, open palm to trigger the overlay menu to appear. The overlay menu may comprise three menu items, e.g., "private mode" 1520, "adjust volume" 1530, and "turn off" 1540. The locations of the menu items may depend on the location and pose of the user. They may be chosen to be easily accessible by the user. The overlay menu may also cause the frame size of the user's video to expand to produce more space. FIG. 15B illustrates an example selection of a menu item. The menu items may be selected by the user moving their hand to the overlay. In FIG. 15B, "adjust volume" 1530 was selected. FIG. 15C illustrates an example slider in the video overlay. The user 1510 may choose a value for adjusting the volume by emulating a slider 1550, with the user's 1510 hand position selecting a location along the slider 1550.

In particular embodiments, the video communication system may additionally communicate information about the video communication system to a user. Such information may include the type of data being transmitted from the system (e.g., audio, video, level of obfuscation), the users from which video can be received, the users from which video is currently being received, the layout of the users on the display, etc. The video communication system may provide a clear indication of whether high-fidelity video or audio is being shared through the use of indicator LEDs. Possible form factors for the LED indicator may include, but not limited to, a strip, ring, or other shape on the front of the camera, a pattern on the back of the camera, or client device, illuminating the wall. As a result, these indicator LEDS may enable the user to assess the degree of sharing from a quick glance, thereby preventing undesired sharing when using a permanently connected video communication.

In particular embodiments, the video communication system may further utilize a remote microphone. The remote microphone may be placed in a location that is better suited to hearing the voices of users, such as on the coffee table. The remote microphone may communicate with the video communication system via a fixed wire or wirelessly. A remote control may include LED indicators and the remote microphone may be built into the remote control. The remote microphone may use a rechargeable battery and/or solar panels.

In particular embodiments, the video communication system may satisfy the following criteria. One criterion may be that an originator of a video stream has access to a wide field of view. The areas of interest within the space being shared may change depending on the locations of the subjects. As a result, the camera system of the originator of the video stream may be able to access a wide field of view to capture various ranges of interest. Another criterion may be that a recipient of the video stream may display a narrow field of view. It may be desirable that the recipient's display shows the areas of interest with an appealing scale and detail. Streaming an entire wide-angle camera view may be often a poor choice as the range of interest may constitute a small minority of the total video stream. The video communication system may utilize various methods to fulfill the aforementioned criteria, which may include but not limited to wide angle lens which are common for capturing a wide field of view from a single lens, automated cropping, wide angle lens correction, motorized camera, optical zoom, multiple cameras. With automated cropping, the area of interest may be cropped within a larger field of view. The video communication system may automatically determine the cropping area from a range of inputs, such as the locations of the subjects and their activity. The video communication system may use wide angle lens correction to correct the distortion introduced by wide angle lens. Wide angle lens correction may be performed on only the cropped portion of the video, which may provide better results than if the correction were performed on the entire image followed by cropping. For motorized camera, the camera may be mounted on a gimbal or other rotating element that allows the camera to direct towards an area of interest. This may give the camera access to a larger field of view, without changing to wide angle lens. Optical zoom may allow for narrowing the field of view without losing resolution. Multiple cameras may be combined to provide the benefits of different cameras. For example, wide angle lens may be used to maintain an overall view, whilst a motorized telephoto lens may provide a high-quality close-up view.

Figure 16:
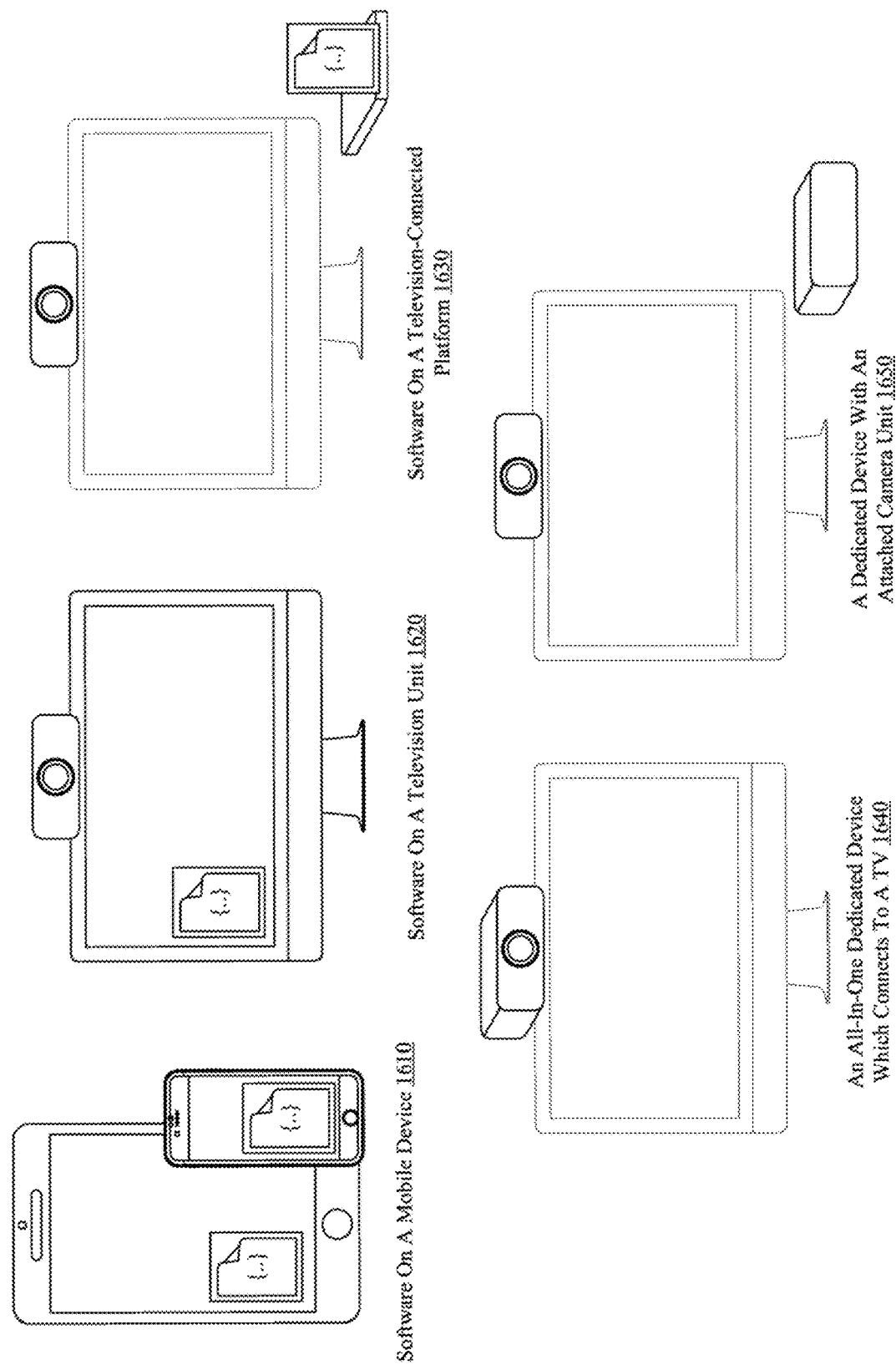
FIG. 16 illustrates example applications of the video communication system.

FIG. 16 illustrates example applications of the video communication system. The video communication system described herein may be applied to any device that supports video communication. Such devices may have a range of form factors. Options may include, but not limited to, software on a mobile device 1610, software on a television unit 1620 optionally with an attached camera unit, software on a television-connected platform 1630 optionally with an attached camera unit, an all-in-one dedicated device which connects to a TV 1640, a dedicated device with an attached camera unit 1650, etc.

Figure 17:
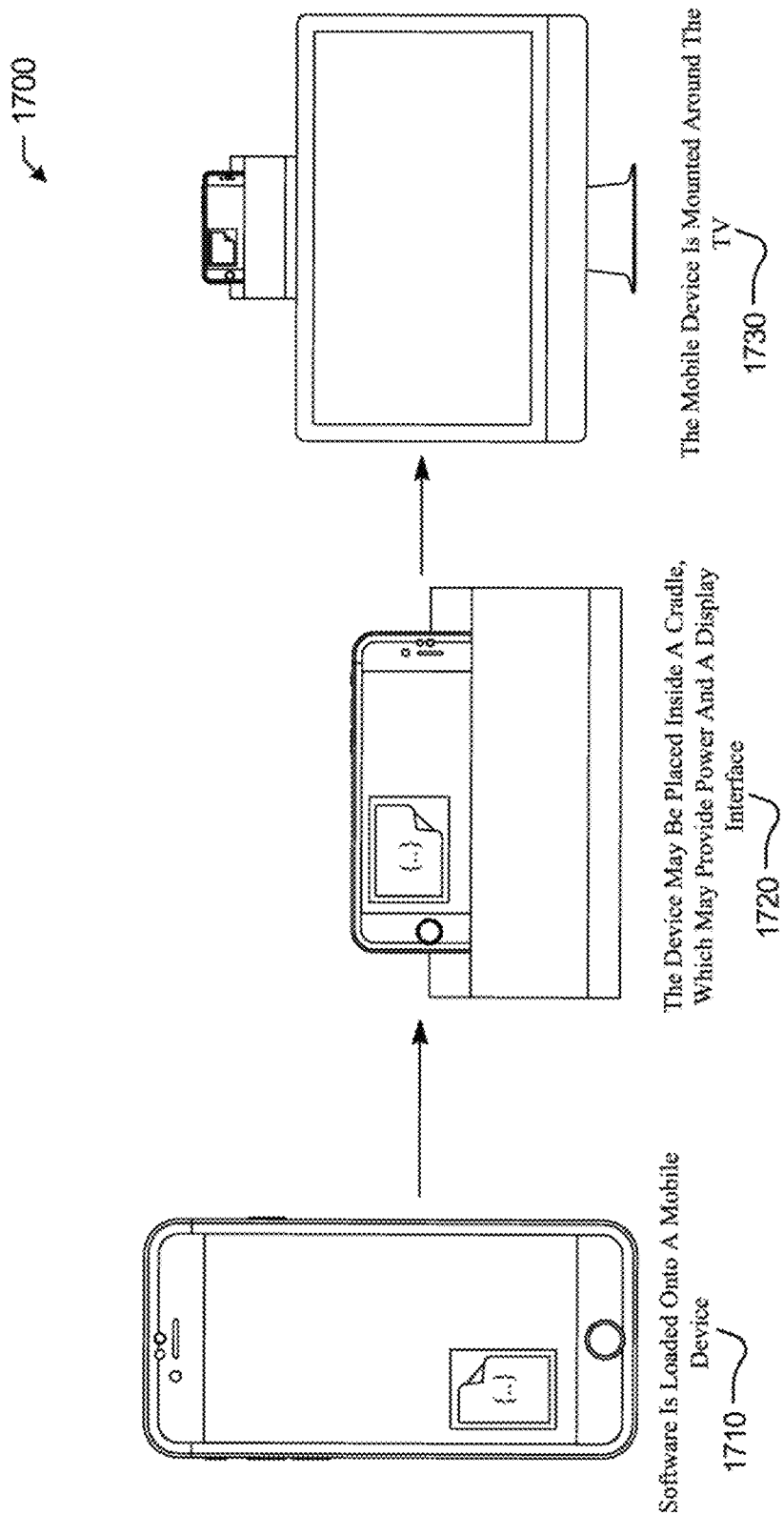
FIG. 17 illustrates an example process of upcycling.

In particular embodiments, the video communication system may be used for upcycling. Upcycling is a process of converting undesired products into new products with desired uses. FIG. 17 illustrates an example process 1700 of upcycling. The video communication system may be consisted of software on a mobile device which is semi-permanently installed around a television. At step 1710, software may be loaded onto a mobile device. The camera(s), microphone(s), processing, display, speaker(s), networking, and other capabilities of the mobile device may be utilized. At step 1720, the mobile device may be placed inside a cradle. At step 1730, the mobile device may be mounted around the TV. The cradle may be used to support the desired mounting of the mobile device, e.g., by providing power. The cradle may also provide access to a display interface such as HDMI that would allow the mobile device to output video and audio to the TV. Wireless display transmission may be used to send video and audio output to the TV.

Figure 18:
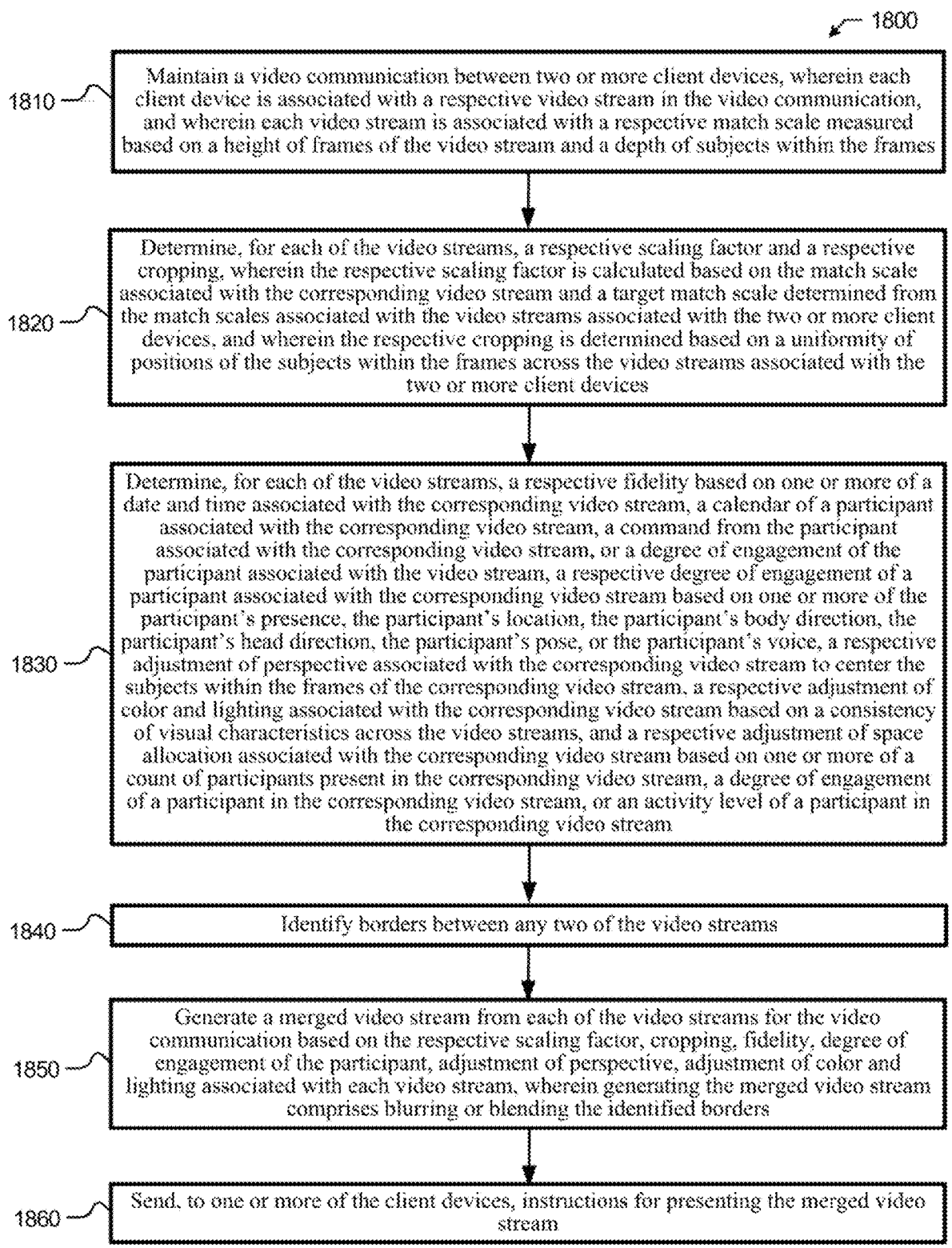
FIG. 18 illustrates is a flow diagram of a method for improving the presentation of multiple video streams in a video communication, in accordance with the presently disclosed embodiments.

FIG. 18 illustrates is a flow diagram of a method 1800 for improving the presentation of multiple video streams in a video communication, in accordance with the presently disclosed embodiments. The method 1800 may be performed utilizing one or more processing devices (e.g., the electronic device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 1800 may begin at step 1810 with the one or more processing devices (e.g., the electronic device 100). For example, in particular embodiments, the electronic device 100 may maintain a video communication between two or more client devices, wherein each client device is associated with a respective video stream in the video communication, and wherein each video stream is associated with a respective match scale measured based on a height of frames of the video stream and a depth of subjects within the frames. The method 1800 may then continue at step 1820 with the one or more processing devices (e.g., the electronic device 100). For example, the electronic device 100 may determine, for each of the video streams, a respective scaling factor and a respective cropping, wherein the respective scaling factor is calculated based on the match scale associated with the corresponding video stream and a target match scale determined from the match scales associated with the video streams associated with the two or more client devices, and wherein the respective cropping is determined based on a uniformity of positions of the subjects within the frames across the video streams associated with the two or more client devices. The method 1800 may then continue at step 1830 with the one or more processing devices (e.g., the electronic device 100). For example, in particular embodiments, the electronic device 100 may determine, for each of the video streams, a respective fidelity based on one or more of a date and time associated with the corresponding video stream, a calendar of a participant associated with the corresponding video stream, a command from the participant associated with the corresponding video stream, or a degree of engagement of the participant associated with the video stream, a respective degree of engagement of a participant associated with the corresponding video stream based on one or more of the participant's presence, the participant's location, the participant's body direction, the participant's head direction, the participant's pose, or the participant's voice, a respective adjustment of perspective associated with the corresponding video stream to center the subjects within the frames of the corresponding video stream, a respective adjustment of color and lighting associated with the corresponding video stream based on a consistency of visual characteristics across the video streams, and a respective adjustment of space allocation associated with the corresponding video stream based on one or more of a count of participants present in the corresponding video stream, a degree of engagement of a participant in the corresponding video stream, or an activity level of a participant in the corresponding video stream. The method 1800 may then continue at block 1840 with the one or more processing devices (e.g., the electronic device 100). For example, in particular embodiments, the electronic device 100 may identify borders between any two of the video streams. The method 1800 may then continue at step 1850 with the one or more processing devices (e.g., the electronic device 100). For example, in particular embodiments, the electronic device 100 may generate a merged video stream from each of the video streams for the video communication based on the respective scaling factor, cropping, fidelity, degree of engagement of the participant, adjustment of perspective, adjustment of color and lighting associated with each video stream, wherein generating the merged video stream comprises blurring or blending the identified borders. The method 1800 may then continue at block 1860 with the one or more processing devices (e.g., the electronic device 100). For example, in particular embodiments, the electronic device 100 may send, to one or more of the client devices, instructions for presenting the merged video stream. Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for improving the presentation of multiple video streams in a video communication including the particular steps of the method of FIG. 18, this disclosure contemplates any suitable method for improving the presentation of multiple video streams in a video communication including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Systems and Methods

Figure 19:
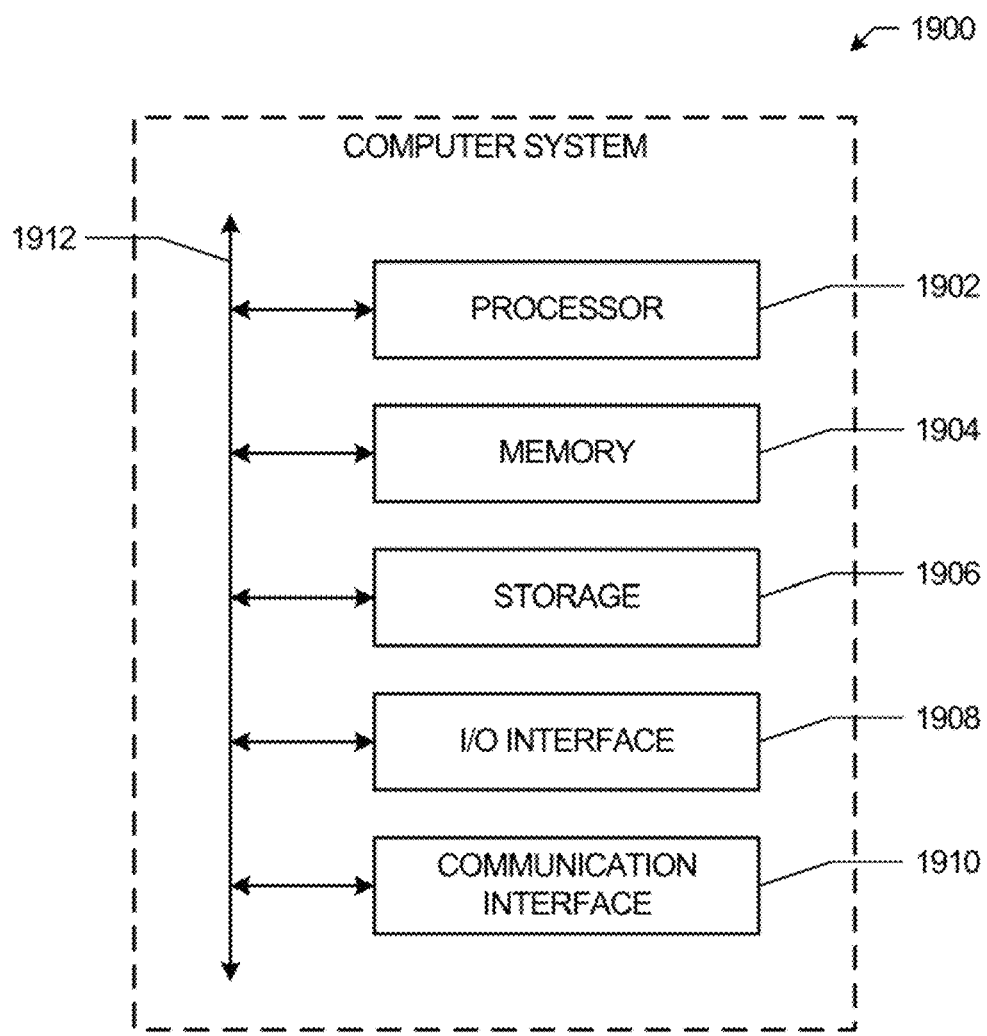
FIG. 19 illustrates an example computer system.

FIG. 19 illustrates an example computer system 1900 that may be utilized to perform improving the presentation of multiple video streams in a video communication, in accordance with the presently disclosed embodiments. In particular embodiments, one or more computer systems 1900 perform one or more steps of one or more methods described or illustrated herein. In particular embodiments, one or more computer systems 1900 provide functionality described or illustrated herein. In particular embodiments, software running on one or more computer systems 1900 performs one or more steps of one or more methods described or illustrated herein or provides functionality described or illustrated herein. Particular embodiments include one or more portions of one or more computer systems 1900. Herein, reference to a computer system may encompass a computing device, and vice versa, where appropriate. Moreover, reference to a computer system may encompass one or more computer systems, where appropriate.

This disclosure contemplates any suitable number of computer systems 1900. This disclosure contemplates computer system 1900 taking any suitable physical form. As example and not by way of limitation, computer system 1900 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1900 may include one or more computer systems 1900; be unitary or distributed; span multiple locations; span multiple machines; span multiple data centers; or reside in a cloud, which may include one or more cloud components in one or more networks.

Where appropriate, one or more computer systems 1900 may perform without substantial spatial or temporal limitation one or more steps of one or more methods described or illustrated herein. As an example, and not by way of limitation, one or more computer systems 1900 may perform in real time or in batch mode one or more steps of one or more methods described or illustrated herein. One or more computer systems 1900 may perform at different times or at different locations one or more steps of one or more methods described or illustrated herein, where appropriate.

In particular embodiments, computer system 1900 includes a processor 1902, memory 1904, storage 1906, an input/output (I/O) interface 1908, a communication interface 1910, and a bus 1912. Although this disclosure describes and illustrates a particular computer system having a particular number of particular components in a particular arrangement, this disclosure contemplates any suitable computer system having any suitable number of any suitable components in any suitable arrangement. In particular embodiments, processor 1902 includes hardware for executing instructions, such as those making up a computer program. As an example, and not by way of limitation, to execute instructions, processor 1902 may retrieve (or fetch) the instructions from an internal register, an internal cache, memory 1904, or storage 1906; decode and execute them; and then write one or more results to an internal register, an internal cache, memory 1904, or storage 1906. In particular embodiments, processor 1902 may include one or more internal caches for data, instructions, or addresses. This disclosure contemplates processor 1902 including any suitable number of any suitable internal caches, where appropriate. As an example, and not by way of limitation, processor 1902 may include one or more instruction caches, one or more data caches, and one or more translation lookaside buffers (TLBs). Instructions in the instruction caches may be copies of instructions in memory 1904 or storage 1906, and the instruction caches may speed up retrieval of those instructions by processor 1902.

Data in the data caches may be copies of data in memory 1904 or storage 1906 for instructions executing at processor 1902 to operate on; the results of previous instructions executed at processor 1902 for access by subsequent instructions executing at processor 1902 or for writing to memory 1904 or storage 1906; or other suitable data. The data caches may speed up read or write operations by processor 1902. The TLBs may speed up virtual-address translation for processor 1902. In particular embodiments, processor 1902 may include one or more internal registers for data, instructions, or addresses. This disclosure contemplates processor 1902 including any suitable number of any suitable internal registers, where appropriate. Where appropriate, processor 1902 may include one or more arithmetic logic units (ALUs); be a multi-core processor; or include one or more processors 1902. Although this disclosure describes and illustrates a particular processor, this disclosure contemplates any suitable processor.

In particular embodiments, memory 1904 includes main memory for storing instructions for processor 1902 to execute or data for processor 1902 to operate on. As an example, and not by way of limitation, computer system 1900 may load instructions from storage 1906 or another source (such as, for example, another computer system 1900) to memory 1904. Processor 1902 may then load the instructions from memory 1904 to an internal register or internal cache. To execute the instructions, processor 1902 may retrieve the instructions from the internal register or internal cache and decode them. During or after execution of the instructions, processor 1902 may write one or more results (which may be intermediate or final results) to the internal register or internal cache. Processor 1902 may then write one or more of those results to memory 1904. In particular embodiments, processor 1902 executes only instructions in one or more internal registers or internal caches or in memory 1904 (as opposed to storage 1906 or elsewhere) and operates only on data in one or more internal registers or internal caches or in memory 1904 (as opposed to storage 1906 or elsewhere).

One or more memory buses (which may each include an address bus and a data bus) may couple processor 1902 to memory 1904. Bus 1912 may include one or more memory buses, as described below. In particular embodiments, one or more memory management units (MMUs) reside between processor 1902 and memory 1904 and facilitate accesses to memory 1904 requested by processor 1902. In particular embodiments, memory 1904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1904 may include one or more memory devices 1904, where appropriate. Although this disclosure describes and illustrates particular memory, this disclosure contemplates any suitable memory.

In particular embodiments, storage 1906 includes mass storage for data or instructions. As an example, and not by way of limitation, storage 1906 may include a hard disk drive (HDD), a floppy disk drive, flash memory, an optical disc, a magneto-optical disc, magnetic tape, or a Universal Serial Bus (USB) drive or a combination of two or more of these. Storage 1906 may include removable or non-removable (or fixed) media, where appropriate. Storage 1906 may be internal or external to computer system 1900, where appropriate. In particular embodiments, storage 1906 is non-volatile, solid-state memory. In particular embodiments, storage 1906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1906 taking any suitable physical form. Storage 1906 may include one or more storage control units facilitating communication between processor 1902 and storage 1906, where appropriate. Where appropriate, storage 1906 may include one or more storages 1906. Although this disclosure describes and illustrates particular storage, this disclosure contemplates any suitable storage.

In particular embodiments, I/O interface 1908 includes hardware, software, or both, providing one or more interfaces for communication between computer system 1900 and one or more I/O devices. Computer system 1900 may include one or more of these I/O devices, where appropriate. One or more of these I/O devices may enable communication between a person and computer system 1900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1906 for them. Where appropriate, I/O interface 1908 may include one or more device or software drivers enabling processor 1902 to drive one or more of these I/O devices. I/O interface 1908 may include one or more I/O interfaces 1906, where appropriate. Although this disclosure describes and illustrates a particular I/O interface, this disclosure contemplates any suitable I/O interface.

In particular embodiments, communication interface 1910 includes hardware, software, or both providing one or more interfaces for communication (such as, for example, packet-based communication) between computer system 1900 and one or more other computer systems 1900 or one or more networks. As an example, and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1910 for it. As an example, and not by way of limitation, computer system 1900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1900 may include any suitable communication interface 1910 for any of these networks, where appropriate. Communication interface 1910 may include one or more communication interfaces 1910, where appropriate. Although this disclosure describes and illustrates a particular communication interface, this disclosure contemplates any suitable communication interface.

In particular embodiments, bus 1912 includes hardware, software, or both coupling components of computer system 1900 to each other. As an example, and not by way of limitation, bus 1912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1912 may include one or more buses 1912, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
maintaining a video communication between two or more client devices, wherein each client device is associated with a respective video stream in the video communication, and wherein each video stream is associated with a respective match scale measured based on a height of frames of the video stream and a depth of subjects within the frames;
determining, for each of the video streams, a respective scaling factor and a respective cropping, wherein the respective scaling factor is calculated based on the match scale associated with the corresponding video stream and a target match scale determined from the match scales associated with the video streams associated with the two or more client devices, and wherein the respective cropping is determined based on a uniformity of positions of the subjects within the frames across the video streams associated with the two or more client devices;
generating, based on the respective scaling factor and cropping of each video stream, a merged video stream from each of the video streams for the video communication; and
sending, to one or more of the client devices, instructions for presenting the merged video stream.

2. The method of claim 1, further comprising:
determining, for each of the video streams, a respective fidelity based on one or more of a date and time associated with the corresponding video stream, a calendar of a participant associated with the corresponding video stream, a command from the participant associated with the corresponding video stream, or a degree of engagement of the participant associated with the video stream, wherein generating the merged video stream is further based on the respective fidelity associated with each of the video streams.

3. The method of claim 1, further comprising:
determining, for each of the video streams, a respective degree of engagement of a participant associated with the corresponding video stream based on one or more of the participant's presence, the participant's location, the participant's body direction, the participant's head direction, the participant's pose, or the participant's voice, wherein generating the merged video stream is further based on the respective degree of engagement of the participant associated with each of the video streams.

4. The method of claim 1, further comprising:
determining, for each of the video streams, a respective adjustment of perspective associated with the corresponding video stream to center the subjects within the frames of the corresponding video stream, wherein generating the merged video stream is further based on the respective adjustment of perspective associated with each of the video streams.

5. The method of claim 1, further comprising:
determining, for each of the video streams, a respective adjustment of color and lighting associated with the corresponding video stream based on a consistency of visual characteristics across the video streams, wherein generating the merged video stream is further based on the respective adjustment of color and lighting associated with each of the video streams.

6. The method of claim 1, further comprising:
identifying borders between any two of the video streams, wherein generating the merged video stream comprises blurring or blending the identified borders.

7. The method of claim 1, further comprising:
determining, for each of the video streams, a respective adjustment of space allocation associated with the corresponding video stream based on one or more of a count of participants present in the corresponding video stream, a degree of engagement of a participant in the corresponding video stream, or an activity level of a participant in the corresponding video stream, wherein generating the merged video stream is further based on the respective adjustment of space allocation associated with each of the video streams.

8. An electronic device comprising:
one or more displays;
one or more non-transitory computer-readable storage media including instructions; and
one or more processors coupled to the storage media, the one or more processors configured to execute the instructions to:
  maintain a video communication between two or more client devices, wherein each client device is associated with a respective video stream in the video communication, and wherein each video stream is associated with a respective match scale measured based on a height of frames of the video stream and a depth of subjects within the frames;
  determine, for each of the video streams, a respective scaling factor and a respective cropping, wherein the respective scaling factor is calculated based on the match scale associated with the corresponding video stream and a target match scale determined from the match scales associated with the video streams associated with the two or more client devices, and wherein the respective cropping is determined based on a uniformity of positions of the subjects within the frames across the video streams associated with the two or more client devices;
  generate, based on the respective scaling factor and cropping of each video stream, a merged video stream from each of the video streams for the video communication; and
  send, to one or more of the client devices, instructions for presenting the merged video stream.

9. The electronic device of claim 8, wherein the processors are further configured to execute the instructions to:
determine, for each of the video streams, a respective fidelity based on one or more of a date and time associated with the corresponding video stream, a calendar of a participant associated with the corresponding video stream, a command from the participant associated with the corresponding video stream, or a degree of engagement of the participant associated with the video stream, wherein generating the merged video stream is further based on the respective fidelity associated with each of the video streams.

10. The electronic device of claim 8, wherein the processors are further configured to execute the instructions to:
determine, for each of the video streams, a respective degree of engagement of a participant associated with the corresponding video stream based on one or more of the participant's presence, the participant's location, the participant's body direction, the participant's head direction, the participant's pose, or the participant's voice, wherein generating the merged video stream is further based on the respective degree of engagement of the participant associated with each of the video streams.

11. The electronic device of claim 8, wherein the processors are further configured to execute the instructions to:
determine, for each of the video streams, a respective adjustment of perspective associated with the corresponding video stream to center the subjects within the frames of the corresponding video stream, wherein generating the merged video stream is further based on the respective adjustment of perspective associated with each of the video streams.

12. The electronic device of claim 8, wherein the processors are further configured to execute the instructions to:
determine, for each of the video streams, a respective adjustment of color and lighting associated with the corresponding video stream based on a consistency of visual characteristics across the video streams, wherein generating the merged video stream is further based on the respective adjustment of color and lighting associated with each of the video streams.

13. The electronic device of claim 8, wherein the processors are further configured to execute the instructions to:
identify borders between any two of the video streams, wherein generating the merged video stream comprises blurring or blending the identified borders.

14. The electronic device of claim 8, wherein the processors are further configured to execute the instructions to:
determine, for each of the video streams, a respective adjustment of space allocation associated with the corresponding video stream based on one or more of a count of participants present in the corresponding video stream, a degree of engagement of a participant in the corresponding video stream, or an activity level of a participant in the corresponding video stream, wherein generating the merged video stream is further based on the respective adjustment of space allocation associated with each of the video streams.

15. A computer-readable non-transitory storage media comprising instructions executable by a processor to:
maintain a video communication between two or more client devices, wherein each client device is associated with a respective video stream in the video communication, and wherein each video stream is associated with a respective match scale measured based on a height of frames of the video stream and a depth of subjects within the frames;
determine, for each of the video streams, a respective scaling factor and a respective cropping, wherein the respective scaling factor is calculated based on the match scale associated with the corresponding video stream and a target match scale determined from the match scales associated with the video streams associated with the two or more client devices, and wherein the respective cropping is determined based on a uniformity of positions of the subjects within the frames across the video streams associated with the two or more client devices;

generate, based on the respective scaling factor and cropping of each video stream, a merged video stream from each of the video streams for the video communication; and send, to one or more of the client devices, instructions for presenting the merged video stream.

16. The media of claim 15, wherein the instructions are further executable by the processor to:
determine, for each of the video streams, a respective fidelity based on one or more of a date and time associated with the corresponding video stream, a calendar of a participant associated with the corresponding video stream, a command from the participant associated with the corresponding video stream, or a degree of engagement of the participant associated with the video stream, wherein generating the merged video stream is further based on the respective fidelity associated with each of the video streams.

17. The media of claim 15, wherein the instructions are further executable by the processor to:
determine, for each of the video streams, a respective degree of engagement of a participant associated with the corresponding video stream based on one or more of the participant's presence, the participant's location, the participant's body direction, the participant's head direction, the participant's pose, or the participant's voice, wherein generating the merged video stream is further based on the respective degree of engagement of the participant associated with each of the video streams.

18. The media of claim 15, wherein the instructions are further executable by the processor to:
determine, for each of the video streams, a respective adjustment of perspective associated with the corresponding video stream to center the subjects within the frames of the corresponding video stream, wherein generating the merged video stream is further based on the respective adjustment of perspective associated with each of the video streams.

19. The media of claim 15, wherein the instructions are further executable by the processor to:
determine, for each of the video streams, a respective adjustment of color and lighting associated with the corresponding video stream based on a consistency of visual characteristics across the video streams, wherein generating the merged video stream is further based on the respective adjustment of color and lighting associated with each of the video streams.

20. The media of claim 15, wherein the instructions are further executable by the processor to:
identify borders between any two of the video streams, wherein generating the merged video stream comprises blurring or blending the identified borders.

21. A method comprising, by an electronic device:
maintaining a video communication between two or more client devices, wherein each client device is associated with a respective video stream in the video communication; and
automatically adjusting, for each of the video streams, a respective amount of applied obfuscation to the video stream based on a degree of engagement, with the video communication, of a participant shown in the video stream, by (1) increasing the amount of applied obfuscation as the engagement of the participant with the video communication decreases and (2) decreasing the amount of applied obfuscation as the engagement of the participant with the video communication increases.

22. The method of claim 21, further comprising:
determining, for each of the video streams, a respective degree of engagement of a participant associated with the corresponding video stream based on one or more of the participant's presence, the participant's location, the participant's body direction, the participant's head direction, the participant's pose, or the participant's voice.

* * * * *